(12) United States Patent
Ibamoto et al.

(10) Patent No.: US 8,887,589 B2
(45) Date of Patent: Nov. 18, 2014

(54) TWIN CLUTCH TRANSMISSION

(75) Inventors: Masahiko Ibamoto, Saitama (JP);
Hideki Nakamura, Saitama (JP);
Daisuke Hagihara, Saitama (JP)

(73) Assignee: Hitachi Nico Transmission, Co., Ltd., Saitama (JP)

( * ) Notice: Subject to any disclaimer, the term of this patent is extended or adjusted under 35 U.S.C. 154(b) by 235 days.

(21) Appl. No.: 13/700,495

(22) PCT Filed: May 31, 2011

(86) PCT No.: PCT/JP2011/062435
§ 371 (c)(1),
(2), (4) Date: Feb. 21, 2013

(87) PCT Pub. No.: WO2011/152374
PCT Pub. Date: Dec. 8, 2011

(65) Prior Publication Data
US 2013/0160587 A1 Jun. 27, 2013

(30) Foreign Application Priority Data

Jun. 1, 2010 (JP) ................................. 2010-125485

(51) Int. Cl.
*F16H 3/08* (2006.01)
*F16H 3/00* (2006.01)
*F16H 37/04* (2006.01)
(52) U.S. Cl.
CPC .................. *F16H 3/08* (2013.01); *F16H 3/006* (2013.01); *F16H 2037/044* (2013.01); *F16H 2037/049* (2013.01); *F16H 2200/006* (2013.01); *F16H 2200/0095* (2013.01)
USPC ............................................. 74/331; 74/330
(58) Field of Classification Search
CPC ........................ F16H 3/006; F16H 2003/0931

USPC ..................................................... 74/330, 331
See application file for complete search history.

(56) References Cited

U.S. PATENT DOCUMENTS 7,846,055 B2 * 12/2010 Earhart ......................... 475/207
8,050,830 B2 * 11/2011 Komeda et al. ................. 701/51
(Continued)

FOREIGN PATENT DOCUMENTS

| EP | 1624232 A1 | 2/2006 |
| EP | 2243983 A2 | 10/2010 |

(Continued)

OTHER PUBLICATIONS

Extended European Search Report for corresponding application EP11789777.7, European Patent Office, Aug. 19, 2013.

(Continued)

*Primary Examiner* — Ha D Ho
(74) *Attorney, Agent, or Firm* — Porzio, Bromberg & Newman, P.C.

(57) ABSTRACT

A twin clutch transmission for a large horsepower vehicle having a compact size and a high transmission efficiency is obtained. In a twin clutch transmission, there are provided an input shaft, an odd-numbered level speed change mechanism 30, an even-numbered level speed change mechanism 60, a synchronizing speed change mechanism 100, and an output mechanism 90. The speed change mechanisms 30 and 60 include transmission gear trains 32 and 62, main clutches 34 and 64 for selectively transmitting the powers of the transmission gear trains 32 and 62 to the transmission shafts 40 and 70. The synchronizing speed change mechanism 100 includes synchronizing gear trains 110 and 120 for coupling the rotation of the odd-numbered level transmission shaft 32 with the rotation of the even-numbered level transmission shaft 62, and synchronizing clutches 112 and 122 for selecting coupling by this synchronizing gear train.

13 Claims, 26 Drawing Sheets

(56) References Cited

U.S. PATENT DOCUMENTS

| | | | |
|---|---|---|---|
| 8,666,614 B2 * | 3/2014 | Nakamura et al. | 701/51 |
| 8,696,505 B2 * | 4/2014 | Lee et al. | 475/5 |
| 2002/0033059 A1 * | 3/2002 | Pels et al. | 74/329 |
| 2003/0178278 A1 | 9/2003 | Shigyo | |

FOREIGN PATENT DOCUMENTS

| | | |
|---|---|---|
| GB | 2110324 A | 6/1983 |
| JP | 1220761 A | 9/1989 |
| JP | 2103555 U | 8/1990 |
| JP | 2565596 Y2 | 3/1998 |
| JP | 2003269592 A | 9/2003 |
| JP | 2010151159 A | 7/2010 |
| WO | 92/08067 | 5/1992 |

OTHER PUBLICATIONS

Kimura et al., "Driving Pleasure—Newly Developed Twin Clutch SST (Sport Shift Transmission)" Mitsubishi Motors Technical Review 2008, No. 20, pp. 31-34.

* cited by examiner

TWIN CLUTCH TRANSMISSION

CROSS REFERENCE TO RELATED APPLICATION

This is a National Stage of International Application No. PCT/JP2011/062435, filed 31 May 2011, which claims the benefit of Application No. 2010-125485, filed in Japan on 1 Jun. 2010, the disclosures of which Applications are incorporated by reference herein.

FIELD

The present invention relates to a twin clutch transmission that performs speed change control by combining two or more clutches and that is suitable generally for a large horsepower vehicle and particularly for a diesel railcar (a railroad vehicle self-propelled by means of a heat engine installed therein as a power source).

BACKGROUND

Conventionally, a transmission including: a torque converter for transmitting a power of an engine (particularly a diesel engine); gears in a plurality of levels connected to the torque converter; and a multiplate wet clutch for switching these gears has been utilized as a transmission for a diesel railcar or the like (see the publication of Japanese Utility Model Registration No. 2565596 as Patent Literature 1). There has been also suggested a technique for improving a transmission efficiency in a transmission for a diesel railcar by employing a mechanical clutch in place of the above-described multiplate wet clutch (see Japanese Utility Model Application Laid-open No. Hei. 2-103555 as Patent Literature 2 and Japanese Patent Application Laid-open No. Hei. 1-220761 as Patent Literature 3).

In recent years, a twin clutch transmission has been put into practical use for automobiles (see Japanese Patent Application Laid-open No. 2003-269592 as Patent Literature 4 and Mitsubishi Motors Technical Review 2008, No. 20, pp. 31 to 34 as Non Patent Literature 1). This twin clutch transmission has been conventionally used also as a transmission for a racing car.

SUMMARY

Technical Problem

In a transmission for a large horsepower vehicle such as for a diesel railcar, due to the output characteristics of an engine thereof, traction is obtained in a low vehicle speed range by utilizing power transmission via a torque converter. However, the torque converter generally has a low transmission efficiency due to the intervention of a fluid. Thus, as an operating time by the torque converter is increased, the transmission efficiency of the transmission is deteriorated accordingly.

In order to ameliorate this, the efficiency has been improved in recent years by increasing the number of shift levels in a transmission to 3 to 4 levels and performing a direct-coupled operation without the intervention of a torque converter during an operation at a middle or high speed.

The increase in the number of shift levels, however, leads to an increase in the number of multiplate wet clutches installed in the respective levels. Since uncoupled (unrelated to the power transmission) multiplate wet clutches run idle, idling loss is generated due to drag friction. Even if the number of shift levels is increased and an operating time during which the torque converter is intervened is reduced, the idling loss is increased due to the increase in the number of idling multiplate wet clutches. Thus, it is practically difficult to improve the efficiency significantly. Especially in the case of a diesel railcar, the idling loss of the multiplate wet clutch is non-negligible since the operating time thereof is long.

By the way, in the transmission for a large horsepower vehicle, the inertia of a power transmission system is significantly larger than that in an automobile. Thus, it is impossible to employ a synchromesh-utilizing friction-type synchronization mechanism which is employed in automobiles. If the mechanical clutches as disclosed in the above-described Patent Literatures 2 and 3 are employed as a substitute for this, there is generated a problem that a synchronization control system for the clutch is complicated. In particular, if the number of shift levels is increased in order to perform a direct-coupled operation even in a low-speed range, the synchronization control is further complicated. The above-described twin clutch transmissions for automobiles all have a configuration using a synchromesh. Thus, there is also a problem that it cannot be used as it is when a large horsepower, a large torque, and a large inertia are transmitted as in a diesel railcar.

Moreover, a diesel railcar is a vehicle for which an operating time for the forward movement and that for the backward movement are approximately the same. Thus, it is required that no imbalance occurs in the number of gear meshes between during the forward movement and during the backward movement. If such imbalance occurs, the transmission efficiency is reduced in either the forward movement or the backward movement.

The present invention has been made in view of the above-described problems, and an object thereof is to improve the efficiency by a twin clutch transmission for a large horsepower vehicle with its compact and simple configuration.

Solution to Problem

The present invention achieving the above-described object is a twin clutch transmission including: an input shaft to which a power of an engine is inputted; an output shaft from which at least a rotation in a first direction is outputted; an odd-numbered level speed change mechanism to which a rotation of the input shaft is transmitted, the odd-numbered level speed change mechanism performing a speed change of an odd-numbered level when the output shaft is rotated in the first direction; an even-numbered level speed change mechanism to which a rotation of the input shaft is transmitted, the even-numbered level speed change mechanism performing a speed change of an even-numbered level when the output shaft is rotated in the first direction; a synchronizing speed change mechanism for synchronizing the odd-numbered level speed change mechanism and the even-numbered level speed change mechanism at a time of a speed change; and an output mechanism for transmitting powers of the odd-numbered level speed change mechanism and the even-numbered level speed change mechanism to the output shaft. In this configuration, the odd-numbered level speed change mechanism includes an odd-numbered level transmission shaft, an odd-numbered level transmission gear train placed between the input shaft and the odd-numbered level transmission shaft, an odd-numbered level main clutch for selectively transmitting a rotation of the input shaft to the odd-numbered level transmission shaft via the odd-numbered level transmission gear train, an odd-numbered level speed-changing gear train provided on the odd-numbered level transmission shaft, for transmitting the rotation to the output mechanism, and an odd-numbered level mechanical clutch for selectively coupling the odd-numbered level speed-changing gear train with the odd-numbered level transmission shaft. Further in this configuration, the even-numbered level speed change mechanism includes an even-numbered level transmission shaft, an even-numbered level transmission gear train placed between the input shaft and the even-numbered level transmission shaft, an even-numbered level main clutch for selectively transmitting a rotation of the input shaft to the even-numbered level transmission shaft via the even-numbered level transmission gear train, an even-numbered level speed-changing gear train provided on the even-numbered level transmission shaft, for transmitting the rotation to the output mechanism, and an even-numbered level mechanical clutch for selectively coupling the even-numbered level speed-changing gear train with the even-numbered level transmission shaft. Further in this configuration, the synchronizing speed change mechanism includes a synchronizing gear train for coupling a rotation of the odd-numbered level transmission shaft with that of the even-numbered level transmission shaft, and a synchronizing clutch for selecting coupling by the synchronizing gear train.

The twin clutch transmission achieving the above-described object in the above-described invention is characterized in that interlevel ratios between adjacent speed levels are set to be approximately constant.

The twin clutch transmission achieving the above-described object in the above-described invention is characterized in that gear ratios of the odd-numbered level transmission gear train and the even-numbered level transmission gear train are set so that a rotation ratio of the even-numbered level transmission shaft with respect to the odd-numbered level transmission shaft becomes approximately equal to the interlevel ratio.

The twin clutch transmission achieving the above-described object in the above-described invention is characterized in that gear ratios of the odd-numbered level speed-changing gear train and the even-numbered level speed-changing gear train are approximately equal to each other between at least apart of adjacent speed change levels, and a gear of the output mechanism is shared between the odd-numbered level speed-changing gear train and the even-numbered level speed-changing gear train.

The synchronizing speed change mechanism of the twin clutch transmission achieving the above-described object in the above-described invention is characterized in that: it includes a first synchronizing gear train for coupling the odd-numbered level transmission shaft and the even-numbered level transmission shaft so as to achieve a first rotation ratio therebetween, a first synchronizing clutch for selecting coupling by the first synchronizing gear train, a second synchronizing gear train for coupling the odd-numbered level transmission shaft and the even-numbered level transmission shaft so as to achieve a second rotation ratio therebetween, and a second synchronizing clutch for selecting coupling by the second synchronizing gear train; and a shift-up or a shift-down is performed while achieving synchronization between the odd-numbered level speed change mechanism and the even-numbered level speed change mechanism by selectively coupling the first synchronizing gear train and the second synchronizing gear train.

The twin clutch transmission achieving the above-described object in the above-described invention is characterized in that the first rotation ratio of the first synchronizing gear train is approximately 1, and the second rotation ratio of the second synchronizing gear train is approximately equal to a square of an interlevel ratio between adjacent speed levels.

The output mechanism of the twin clutch transmission achieving the above-described object in the above-described invention is characterized in that it includes a forward/reverse switching mechanical clutch for switching between a forward rotation and a reverse rotation of the output shaft.

The twin clutch transmission achieving the above-described object in the above-described invention is characterized in that a forward/reverse switching mechanical clutch for switching between a forward rotation and a reverse rotation of the output shaft is provided on the input shaft.

The twin clutch transmission achieving the above-described object in the above-described invention is characterized in that: the odd-numbered level speed change mechanism includes: an odd-numbered level reverse rotation idler shaft placed between the input shaft and the odd-numbered level transmission shaft; an odd-numbered level reverse rotation transmission gear train placed between the input shaft, the reverse rotation idler shaft, and the odd-numbered level transmission shaft; an odd-numbered level main clutch for coupling the input shaft and the odd-numbered level transmission gear train; an odd-numbered level reverse rotation main clutch for coupling the input shaft and the odd-numbered level reverse rotation transmission gear train; and an odd-numbered level forward/reverse switching mechanical clutch provided on the odd-numbered level transmission shaft for selecting any one of the odd-numbered level transmission gear train and the odd-numbered level reverse rotation transmission gear train and coupling it with the odd-numbered level transmission shaft; the even-numbered level speed change mechanism includes: an even-numbered level reverse rotation idler shaft placed between the input shaft and the even-numbered level transmission shaft; an even-numbered level reverse rotation transmission gear train placed between the input shaft, the reverse rotation idler shaft, and the even-numbered level transmission shaft; an even-numbered level main clutch for coupling the input shaft and the even-numbered level transmission gear train; an even-numbered level reverse rotation main clutch for coupling the input shaft and the even-numbered level reverse rotation transmission gear train; and an even-numbered level forward/reverse switching mechanical clutch provided on the even-numbered level transmission shaft for selecting any one of the even-numbered level transmission gear train and the even-numbered level reverse rotation transmission gear train and coupling it with the even-numbered level transmission shaft; when the output shaft is rotated in the first direction, a rotation of the input shaft is transmitted in the odd-numbered level speed change mechanism to the odd-numbered level transmission shaft through the odd-numbered level main clutch, the odd-numbered level transmission gear train, and the odd-numbered level forward/reverse switching mechanical clutch, and a rotation of the input shaft is transmitted in the even-numbered level speed change mechanism to the even-numbered level transmission shaft through the even-numbered level main clutch, the even-numbered level transmission gear train, and the even-numbered level forward/reverse switching mechanical clutch; and when the output shaft is rotated in a second direction opposite to the rotation in the first direction, a rotation of the input shaft is transmitted in the odd-numbered level speed change mechanism to the odd-numbered level transmission shaft through the odd-numbered level reverse rotation main clutch, the odd-numbered level reverse rotation transmission gear train, and the odd-numbered level forward/reverse switching mechanical clutch, and a rotation of the input shaft is transmitted in the even-numbered level speed change mechanism to the even-numbered level transmission shaft through the even-numbered level reverse rotation main clutch, the even-numbered level reverse rotation transmission gear train, and the even-numbered level forward/reverse switching mechanical clutch.

The twin clutch transmission achieving the above-described object is characterized in that: in the odd-numbered level speed change mechanism of the above-described invention, an input shaft side gear in the odd-numbered level reverse rotation transmission gear train is shared with an input shaft side gear in the even-numbered level transmission gear train, and the odd-numbered level reverse rotation main clutch is shared with the even-numbered level main clutch; in the even-numbered level speed change mechanism, an input shaft side gear in the even-numbered level reverse rotation transmission gear train is shared with an input shaft side gear in the odd-numbered level transmission gear train, and the even-numbered level reverse rotation main clutch is shared with the odd-numbered level main clutch; and when the output shaft is rotated in the second direction, a rotation of the input shaft is transmitted in the odd-numbered level speed change mechanism to the odd-numbered level transmission shaft through the even-numbered level main clutch, the odd-numbered level reverse rotation transmission gear train, and the odd-numbered level forward/reverse switching mechanical clutch, and a rotation of the input shaft is transmitted in the even-numbered level speed change mechanism to the even-numbered level transmission shaft through the odd-numbered level main clutch, the even-numbered level reverse rotation transmission gear train, and the even-numbered level forward/reverse switching mechanical clutch.

The twin clutch transmission achieving the above-described object is characterized in that: gear ratios of the odd-numbered level reverse rotation transmission gear train and the even-numbered level transmission gear train are approximately equal to each other and gear ratios of the even-numbered level reverse rotation transmission gear train and the odd-numbered level transmission gear train are approximately equal to each other; and when the output shaft is rotated in the second direction, the odd-numbered level speed change mechanism performs a speed change of an even-numbered level and the even-numbered level speed change mechanism performs a speed change of an odd-numbered level.

The synchronizing speed change mechanism of the twin clutch transmission achieving the above-described object in the above-described invention is characterized in that it includes: a first synchronizing gear train for coupling the odd-numbered level transmission shaft and the even-numbered level transmission shaft so as to obtain a first rotation ratio therebetween; a first synchronizing clutch for selecting coupling by the first synchronizing gear train; a second synchronizing gear train for coupling the odd-numbered level transmission shaft and the even-numbered level transmission shaft so as to obtain a second rotation ratio therebetween; a second synchronizing clutch for selecting coupling by the second synchronizing gear train; a third synchronizing gear train for coupling the odd-numbered level transmission shaft and the even-numbered level transmission shaft so as to obtain a third rotation ratio therebetween; and a third synchronizing clutch for selecting coupling by the third synchronizing gear train.

The synchronizing speed change mechanism of the twin clutch transmission achieving the above-described object in the above-described invention is characterized in that: the first rotation ratio is approximately 1, the second rotation ratio is approximately equal to a square of an interlevel ratio between adjacent speed levels, and the third rotation ratio is approximately equal to an inverse of the square of the interlevel ratio; when the output shaft is rotated in the first direction, a shift-up or a shift-down is performed while achieving synchronization between the odd-numbered level speed change mechanism and the even-numbered level speed change mechanism by selectively coupling the first synchronizing gear train with the second synchronizing gear train; and when the output shaft is rotated in the second direction, a shift-up or a shift-down is performed while achieving synchronization between the odd-numbered level speed change mechanism and the even-numbered level speed change mechanism by selectively coupling the first synchronizing gear train with the third synchronizing gear train.

Advantageous Effects of Invention

According to the present invention, there is provided an advantageous effect of obtaining a highly-efficient twin clutch transmission having a compact and simplified configuration and suitable for a large horsepower vehicle.

DESCRIPTION OF EMBODIMENTS

A twin clutch type transmission (hereinafter, referred to as a transmission) according to an exemplary embodiment of the present invention will now be described below with reference to the drawings. Note that a transmission for a diesel railcar will be illustrated herein as an example.

Figure 1:
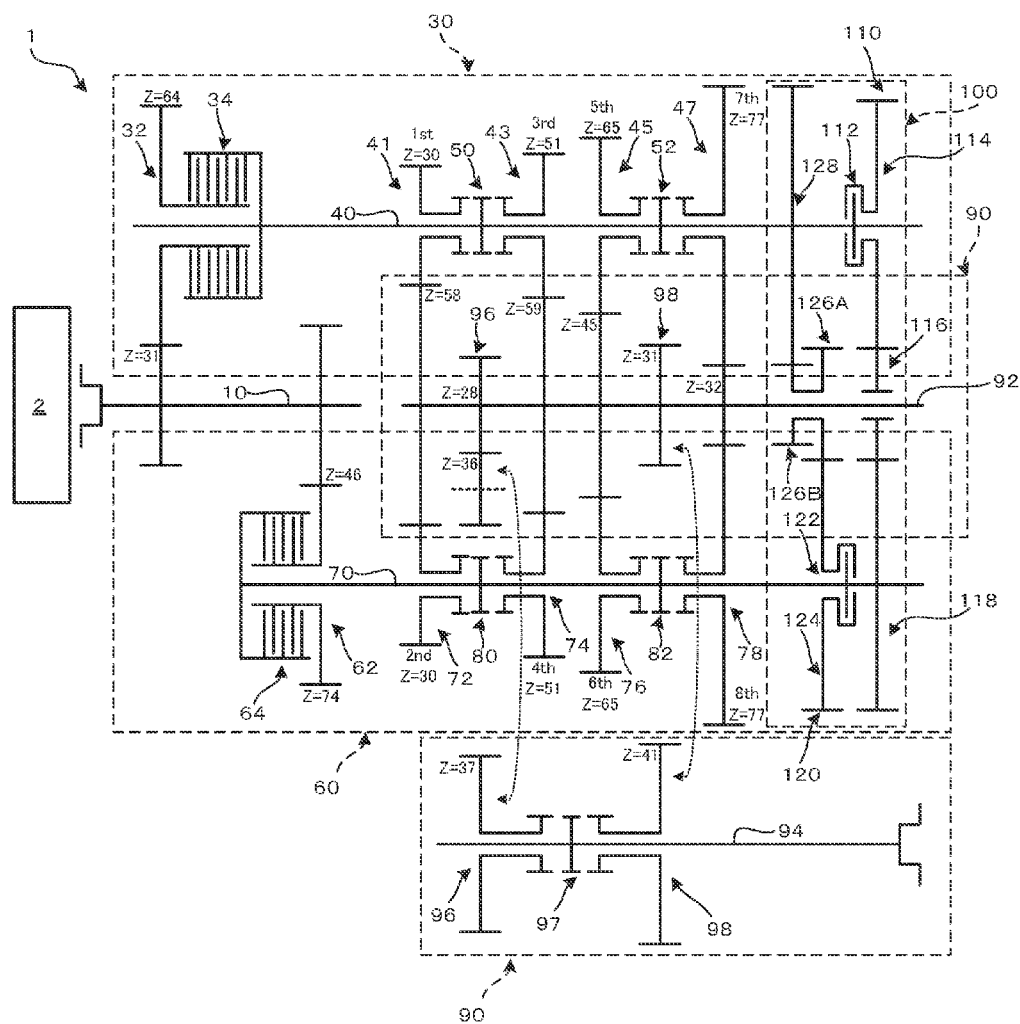
FIG. 1 is a skeleton diagram showing an entire configuration of a twin clutch transmission according to a first embodiment of the present invention.

FIG. 1 shows a configuration of a transmission 1 according to the first embodiment. The transmission 1 includes: an input shaft 10 to which a power of a diesel engine 2 is inputted; an odd-numbered level speed change mechanism 30 to which the rotation of the input shaft 10 is transmitted; an even-numbered level speed change mechanism 60 to which the rotation of the input shaft 10 is transmitted similarly; an output mechanism 90 to which the power of the odd-numbered level speed change mechanism 30 and that of the even-numbered level speed change mechanism 60 are selectively transmitted; and a synchronizing speed change mechanism 100 for synchronizing the odd-numbered level speed change mechanism 30 and the even-numbered level speed change mechanism 60 at the time of speed changes. The odd-numbered level speed change mechanism 30 executes odd-numbered level speed changes of the first, the third, the fifth, and the seventh when an output shaft 94 of the output mechanism 90 rotates in a first direction. The even-numbered level speed change mechanism 60 executes even-numbered level speed changes of the second, the fourth, the sixth, and the eighth when the output shaft 94 of the output mechanism 90 rotates in the first direction. Thus, the transmission 1 can perform speed changes of eight levels in total. In the transmission 1, a clutch is provided in each of the odd-numbered level speed change mechanism 30 and the even-numbered level speed change mechanism 60. As a result, when the power is being transmitted in the odd-numbered level speed change mechanism 30, for example, it is possible to perform a preparation for shift-up or shift-down to an adjacent level on the side of the even-numbered level speed change mechanism 60. Also, when the power is being transmitted in the even-numbered level speed change mechanism 60, it is possible to perform a preparation for shift-up or shift-down to an adjacent level on the side of the odd-numbered level speed change mechanism 30.

The odd-numbered level speed change mechanism 30 includes: an odd-numbered level transmission gear train 32 placed between the input shaft 10 and an odd-numbered level transmission shaft 40, for transmitting the rotation thereof; an odd-numbered level main clutch 34 for selectively transmitting the power of the input shaft 10 to the odd-numbered level transmission shaft 40 via the odd-numbered level transmission gear train 32; first to seventh odd-numbered level speed-changing gear trains 41, 43, 45, and 47 provided on the odd-numbered level transmission shaft 40, for transmitting the rotation to the output mechanism 90 in four levels; and two odd-numbered level mechanical clutches 50 and 52 for selectively coupling the first to seventh odd-numbered level speed-changing gear trains 41, 43, 45, and 47 with the odd-numbered level transmission shaft 40.

The odd-numbered level transmission gear train 32 is configured by a gear pair in which the number of input teeth is 31, the number of output teeth is 64, and the rotation ratio is 2.065. The odd-numbered level transmission gear train 32 is provided between the input shaft 10 and the odd-numbered level main clutch 34 so as to decelerate the rotation of the input shaft 10 and then transmit it to the odd-numbered level main clutch 34. The odd-numbered level main clutch 34 is a multiplate wet clutch and capable of selectively transmitting the rotation of the input shaft 10 to the odd-numbered level transmission shaft 40 by utilizing a hydraulic pressure.

Although a case where the odd-numbered level main clutch 34 is placed between the odd-numbered level transmission gear train 32 and the odd-numbered level transmission shaft 40 is illustrated herein as an example, the odd-numbered level main clutch 34 may be placed between the input shaft 10 and the odd-numbered level transmission gear train 32. In other words, it is also preferable that the odd-numbered level main clutch 34 be placed on the input shaft 10.

The odd-numbered level speed change mechanism 30 selectively transmits the rotation of the input shaft 10 to the odd-numbered level transmission shaft 40 with the rotation ratio of 2.065 by means of the odd-numbered level main clutch 34.

The first speed-changing gear train 41 provided on the odd-numbered level transmission shaft 40 is configured by a gear pair in which the number of the input teeth is 30, the number of the output teeth is 58, and the rotation ratio is 1.933. The first speed-changing gear train 41 transmits the rotation of the odd-numbered level transmission shaft 40 to a counter shaft 92 of the output mechanism 90. The third speed-changing gear train 43 is configured by a gear pair in which the number of the input teeth is 51, the number of the output teeth is 59, and the rotation ratio is 1.157. The third speed-changing gear train 43 transmits the rotation of the odd-numbered level transmission shaft 40 to the counter shaft 92 of the output mechanism 90. The fifth speed-changing gear train 45 is configured by a gear pair in which the number of the input teeth is 65, the number of the output teeth is 45, and the rotation ratio is 0.692. The fifth speed-changing gear train 45 transmits the rotation of the odd-numbered level transmission shaft 40 to the counter shaft 92 of the output mechanism 90. The seventh speed-changing gear train 47 is configured by a gear pair in which the number of the input teeth is 77, the number of the output teeth is 32, and the rotation ratio is 0.416. The seventh speed-changing gear train 47 transmits the rotation of the odd-numbered level transmission shaft 40 to the counter shaft 92 of the output mechanism 90.

One odd-numbered level mechanical clutch 50 is placed between the first speed-changing gear train 41 and the third speed-changing gear train 43. This odd-numbered level mechanical clutch 50 can selectively perform switching among a "first coupled state" where the first speed-changing gear train 41 and the odd-numbered level transmission shaft 40 are coupled together, a "third coupled state" where the third speed-changing gear train 43 and the odd-numbered level transmission shaft 40 are coupled together, and an "uncoupled state" where both of the first and third speed-changing gear trains 41 and 43 are disengaged from the odd-numbered level transmission shaft 40.

The other odd-numbered level mechanical clutch 52 is placed between the fifth speed-changing gear train 45 and the seventh speed-changing gear train 47. The odd-numbered level mechanical clutch 52 can selectively perform switching among a "fifth coupled state" where the fifth speed-changing gear train 45 and the odd-numbered level transmission shaft 40 are coupled together, a "seventh coupled state" where the seventh speed-changing gear train 47 and the odd-numbered level transmission shaft 40 are coupled together, and an "uncoupled state" where both of the fifth and seventh speed-changing gear trains 45 and 47 are disengaged from the odd-numbered level transmission shaft 40. Thus, by appropriately switching between these odd-numbered level mechanical clutches 50 and 52, it is possible to appropriately select any one of the first, the third, the fifth, the seventh, and neutral.

The output mechanism 90 includes: the counter shaft 92; the output shaft 94; a forward rotation gear train 96 placed between the counter shaft 92 and the output shaft 94; a reverse rotation gear train 98 similarly placed between the counter shaft 92 and the output shaft 94; and a forward/reverse selecting mechanical clutch 97 placed between the forward rotation gear train 96 and the reverse rotation gear train 98 on the output shaft 94.

The forward rotation gear train 96 is configured by the total of three gears such that an idler gear is inserted between a pair of gears. In the forward rotation gear train 96, the number of the input teeth is 28, the number of idler teeth is 36, the number of the output teeth is 37, and the rotation ratio as a whole is 1.321. Thus, the rotation of the counter shaft 92 is transmitted to the output shaft 94 with this rotation ratio, and the counter shaft 92 and the output shaft 94 are rotated in the same direction. The reverse rotation gear train 98 is configured by a gear pair in which the number of the input teeth is 31, the number of the output teeth is 41, and the rotation ratio is 1.323. The reverse rotation gear train 98 transmits the rotation of the counter shaft 92 to the output shaft 94. In this case, the counter shaft 92 and the output shaft 94 are rotated in the reverse direction. Note that the rotation ratios in the forward rotation and the reverse rotation are set to be approximately the same.

The forward/reverse selecting mechanical clutch 97 selectively performs switching among a "forward rotation coupled state" where the forward rotation gear train 96 and the output shaft 94 are coupled together, a "reverse rotation coupled state" where the reverse rotation gear train 98 and the output shaft 94 are coupled together, and an "uncoupled state" where both of the forward rotation and reverse rotation gear trains 96 and 98 are disengaged from the odd-numbered level transmission shaft 40. As a result, only by appropriately performing switching between the forward rotation and the reverse rotation, speed changes of eight levels can be conducted under approximately the same conditions at the time of the forward rotation and at the time of the reverse rotation. As a result, the transmission 1 can be utilized for a diesel railcar with which a forward movement and a backward movement occur at approximately the same operation frequencies.

The even-numbered level speed change mechanism 60 includes: an even-numbered level transmission gear train 62 placed between the input shaft 10 and an even-numbered level transmission shaft 70, for transmitting the rotation thereof; an even-numbered level main clutch 64 for selectively transmitting the power of the input shaft 10 to the even-numbered level transmission shaft 70 via the even-numbered level transmission gear train 62; second to eighth even-numbered level speed-changing gear trains 72, 74, 76, and 78 provided on the even-numbered level transmission shaft 70, for transmitting the rotation to the output mechanism 90 in four levels; and two even-numbered level mechanical clutches 80 and 82 for selectively coupling the second to eighth even-numbered level speed-changing gear trains 72, 74, 76, and 78 with the even-numbered level transmission shaft 70.

The even-numbered level transmission gear train 62 is configured by a gear pair in which the number of the input teeth is 46, the number of the output teeth is 74, and the rotation ratio is 1.609.

This even-numbered level transmission gear train 62 is provided between the input shaft 10 and the even-numbered level main clutch 64 so as to decelerate the rotation of the input shaft 10 and then transmit it to the even-numbered level main clutch 64. The even-numbered level main clutch 64 is a multiplate wet clutch and capable of selectively transmitting the rotation of the input shaft 10 to the even-numbered level transmission shaft 70.

Although a case where the even-numbered level main clutch 64 is placed between the even-numbered level transmission gear train 62 and the even-numbered level transmission shaft 70 is illustrated herein as an example, the even-numbered level main clutch 64 may be placed between the input shaft 10 and the even-numbered level transmission gear train 62. In other words, it is also preferable that the even-numbered level main clutch 64 be placed on the input shaft 10.

In a steady state, the even-numbered level speed change mechanism 60 selectively transmits the rotation of the input shaft 10 to the even-numbered level transmission shaft 70 with the rotation ratio of 1.609 by means of the even-numbered level main clutch 64.

The second speed-changing gear train 72 provided on the even-numbered level transmission shaft 70 is configured by a gear pair in which the number of the input teeth is 30, the number of the output teeth is 58, and the rotation ratio is 1.933. The second speed-changing gear train 72 transmits the rotation of the even-numbered level transmission shaft 70 to the counter shaft 92 of the output mechanism 90. Note that the output-side gear in this gear pair is shared with the gear pair of the first speed-changing gear train 41 in the odd-numbered level speed change mechanism 30. Moreover, the rotation ratio of the second speed-changing gear train 72 and that of the first speed-changing gear train 41 are set to be approximately the same (herein, exactly the same). Herein, exactly the same gears are actually used for the second speed-changing gear train 72 and the first speed-changing gear train 41. As a result, in the entire transmission 1, a ratio between the first input and output rotation ratio and the second input and output rotation ratio is equal to a ratio between the rotation ratios of the odd-numbered level transmission gear train 32 and the even-numbered level transmission gear train 62.

The fourth speed-changing gear train 74 is configured by a gear pair in which the number of the input teeth is 51, the number of the output teeth is 59, and the rotation ratio is 1.157. The fourth speed-changing gear train 74 transmits the rotation of the even-numbered level transmission shaft 70 to the counter shaft 92 of the output mechanism 90. Note that the output-side gear in this gear pair is shared with the gear pair of the third speed-changing gear train 43 in the odd-numbered level speed change mechanism 30. Moreover, since the rotation ratio of the fourth speed-changing gear train 74 and that of the third speed-changing gear train 43 are set to be approximately the same (herein, exactly the same), exactly the same gears are used in the present embodiment for the fourth speed-changing gear train 74 and the third speed-changing gear train 43. As a result, in the entire transmission 1, an interlevel ratio between the third input and output rotation ratio and the fourth input and output rotation ratio is equal to a ratio between the rotation ratios of the odd-numbered level transmission gear train 32 and the even-numbered level transmission gear train 62.

The sixth speed-changing gear train 76 is configured by a gear pair in which the number of the input teeth is 65, the number of the output teeth is 45, and the rotation ratio is 0.692. The sixth speed-changing gear train 76 transmits the rotation of the even-numbered level transmission shaft 70 to the counter shaft 92 of the output mechanism 90. Note that the output-side gear in this gear pair is shared with the gear pair of the fifth speed-changing gear train 45 in the odd-numbered level speed change mechanism 30. Moreover, since the rotation ratio of the sixth speed-changing gear train 76 and that of the fifth speed-changing gear train 45 are set to be approximately the same (herein, exactly the same), exactly the same gears are used in the present embodiment for the sixth speed-changing gear train 76 and the fifth speed-changing gear train 45. As a result, in the entire transmission 1, an interlevel ratio between the fifth input and output rotation ratio and the sixth input and output rotation ratio is equal to a ratio between the rotation ratios of the odd-numbered level transmission gear train 32 and the even-numbered level transmission gear train 62.

The eighth speed-changing gear train 78 is configured by a gear pair in which the number of the input teeth is 77, the number of the output teeth is 32, and the rotation ratio is 0.416. The eighth speed-changing gear train 78 transmits the rotation of the even-numbered level transmission shaft 70 to the counter shaft 92 of the output mechanism 90. Note that the output-side gear in this gear pair is shared with the gear pair of the seventh speed-changing gear train 47 in the odd-numbered level speed change mechanism 30. Moreover, since the rotation ratio of the eighth speed-changing gear train 78 and that of the seventh speed-changing gear train 47 are set to be approximately the same (herein, exactly the same), exactly the same gears are used in the present embodiment for the eighth speed-changing gear train 78 and the seventh speed-changing gear train 47. As a result, in the entire transmission 1, an interlevel ratio between the seventh input and output rotation ratio and the eighth input and output rotation ratio is equal to a ratio between the rotation ratios of the odd-numbered level transmission gear train 32 and the even-numbered level transmission gear train 62.

One even-numbered level mechanical clutch 80 is placed between the second speed-changing gear train 72 and the fourth speed-changing gear train 74. The even-numbered level mechanical clutch 80 can selectively perform switching among a "second coupled state" where the second speed-changing gear train 72 and the even-numbered level transmission shaft 70 are coupled together, a "fourth coupled state" where the fourth speed-changing gear train 74 and the even-numbered level transmission shaft 70 are coupled together, and an "uncoupled state" where both of the second and fourth speed-changing gear trains 72 and 74 are disengaged from the even-numbered level transmission shaft 70.

The other even-numbered level mechanical clutch 82 is placed between the sixth speed-changing gear train 76 and the eighth speed-changing gear train 78. The even-numbered level mechanical clutch 82 can selectively perform switching among a "sixth coupled state" where the sixth speed-changing gear train 76 and the even-numbered level transmission shaft 70 are coupled together, an "eighth coupled state" where the eighth speed-changing gear train 78 and the even-numbered level transmission shaft 70 are coupled together, and an "uncoupled state" where both of the sixth and eighth speed-changing gear trains 76 and 78 are disengaged from the even-numbered level transmission shaft 70. Thus, by appropriately performing switching between these even-numbered level mechanical clutches 80 and 82, it is possible to appropriately select any one of the second, the fourth, the sixth, the eighth, and neutral.

The synchronizing speed change mechanism 100 includes a first synchronizing gear train 110 and a second synchronizing gear train 120. The first synchronizing gear train 110 selectively couples the odd-numbered level transmission shaft 40 with the even-numbered level transmission shaft 70 so that the rotation of the odd-numbered level transmission shaft 40 and that of the even-numbered level transmission shaft 70 make a first rotation ratio. More specifically, the first synchronizing gear train 110 includes: a first synchronizing clutch 112 provided on the odd-numbered level transmission shaft 40; a first odd-numbered level synchronization gear 114 connected to the first synchronizing clutch 112; a first intermediate synchronization gear 116 placed to be capable of performing free rotation with respect to the counter shaft and meshed with the first odd-numbered level synchronization gear 114; and a first even-numbered level synchronization gear 118 fixed to the even-numbered level transmission shaft 70 and meshed with the first intermediate synchronization gear 116. In the present embodiment, since the number of teeth in the first odd-numbered level synchronization gear 114 and that in the first even-numbered level synchronization gear 118 are set to be the same, the first rotation ratio becomes "approximately 1." Therefore, if the first synchronizing clutch 112 is connected, this odd-numbered level transmission shaft 40 and the even-numbered level transmission shaft 70 are consequently rotated at the same speed.

The second synchronizing gear train 120 selectively couples the odd-numbered level transmission shaft 40 with the even-numbered level transmission shaft 70 so that the rotation of the odd-numbered level transmission shaft 40 and that of the even-numbered level transmission shaft 70 make a second rotation ratio. More specifically, the second synchronizing gear train 120 includes: a second synchronizing clutch 122 provided on the even-numbered level transmission shaft 70; a second even-numbered level synchronization gear 124 connected to the second synchronizing clutch 122; a second large-diameter side intermediate synchronization gear 126A placed to be capable of performing free rotation with respect to the counter shaft 92 and meshed with the second even-numbered level synchronization gear 124; a second small-diameter side intermediate synchronization gear 126B coaxially connected to the second large-diameter side intermediate synchronization gear 126A and having a reduced number of teeth as compared to the second large-diameter side intermediate synchronization gear 126A; and a second odd-numbered level synchronization gear 128 fixed to the odd-numbered level transmission shaft 40 and meshed with the second small-diameter side intermediate synchronization gear 126B.

In the present embodiment, the second rotation ratio is set to be different from the first rotation ratio. More specifically, the second rotation ratio is set to be equal to "approximately the square of an interlevel ratio" from the first to the eighth. The synchronizing speed change mechanism accelerates (or decelerates) the idling (or stopped) odd-numbered level transmission shaft (or the even-numbered level transmission shaft) to achieve a synchronous rotation speed. However, since it is only inertial acceleration (or deceleration), gears and clutches having small capacities are used and can be therefore provided in a compact manner. Note that a multiplate wet clutch is employed for each of the first synchronizing clutch 112 and the second synchronizing clutch 122 since they are coupled with a rotational difference.

As a configuration example of the thus-configured transmission 1, rotation ratios, including the forward rotation and the reverse rotation, from the first to the eighth are as shown by the following table.

shaft 40 and the even-numbered level transmission shaft 70 is equal to a ratio obtained by squaring the above-described interlevel ratio ((about 1.29)$^2$=about 1.64). Thus, in the present embodiment, the rotation ratio between the odd-numbered level transmission shaft 40 and the even-numbered level transmission shaft 70 is forcibly made equal to the square of the interlevel ratio by means of the coupling with the second synchronizing gear train 120 of the synchronizing

TABLE 1

| | (FORWARD ROTATION) | | (REVERSE ROTATION) | |
|---|---|---|---|---|
| FIRST LEVEL | $\frac{64}{31} \times \frac{58}{30} \times \frac{36}{28} \times \frac{37}{36} = 5.274$ | | $\frac{64}{31} \times \frac{58}{30} \times \frac{41}{31} = 5.279$ | |
| | | 1.283 | | 1.284 |
| SECOND LEVEL | $\frac{74}{46} \times \frac{58}{30} \times \frac{36}{28} \times \frac{37}{36} = 4.110$ | | $\frac{74}{46} \times \frac{58}{30} \times \frac{41}{31} = 4.113$ | |
| | | 1.302 | | 1.302 |
| THIRD LEVEL | $\frac{64}{31} \times \frac{59}{51} \times \frac{36}{28} \times \frac{37}{36} = 3.156$ | | $\frac{64}{31} \times \frac{59}{51} \times \frac{41}{31} = 3.159$ | |
| | | 1.283 | | 1.284 |
| FOURTH LEVEL | $\frac{74}{46} \times \frac{59}{51} \times \frac{36}{28} \times \frac{37}{36} = 2.459$ | | $\frac{74}{46} \times \frac{59}{51} \times \frac{41}{31} = 2.461$ | |
| | | 1.302 | | 1.302 |
| FIFTH LEVEL | $\frac{64}{31} \times \frac{45}{65} \times \frac{36}{28} \times \frac{37}{36} = 1.889$ | | $\frac{64}{31} \times \frac{45}{65} \times \frac{41}{31} = 1.890$ | |
| | | 1.284 | | 1.283 |
| SIXTH LEVEL | $\frac{74}{46} \times \frac{45}{65} \times \frac{36}{28} \times \frac{37}{36} = 1.472$ | | $\frac{74}{46} \times \frac{45}{65} \times \frac{41}{31} = 1.473$ | |
| | | 1.298 | | 1.298 |
| SEVENTH LEVEL | $\frac{64}{31} \times \frac{32}{77} \times \frac{36}{28} \times \frac{37}{36} = 1.134$ | | $\frac{64}{31} \times \frac{32}{77} \times \frac{41}{31} = 1.135$ | |
| | | 1.283 | | 1.283 |
| EIGHTH LEVEL | $\frac{74}{46} \times \frac{32}{77} \times \frac{36}{28} \times \frac{37}{36} = 0.883$ | | $\frac{74}{46} \times \frac{32}{77} \times \frac{41}{31} = 0.884$ | |

As can be seen also from this, an interlevel ratio between adjacent speed levels is set to be approximately constant in a range from 1.28 to 1.30 (about 1.29) in this transmission 1. Moreover, this interlevel ratio (about 1.29) is approximately equal to a ratio (1.283=2.065/1.609) between the rotation ratio (2.065) of the odd-numbered level transmission gear train 32 and the rotation ratio (1.609) of the even-numbered level transmission gear train 62. Accordingly, in the present embodiment, the output side gear for making an output to the counter shaft 92 can be shared between the first and the second, between the third and the fourth, between the fifth and the sixth, and between the seventh and the eighth.

For the synchronization at the time of shift-up or shift-down between the levels in which this output side gear is shared (between the first and the second, between the third and the fourth, between the fifth and the sixth, and between the seventh and the eighth), it is only necessary that the rotation of the odd-numbered level transmission shaft 40 is made to coincide with that of the even-numbered level transmission shaft 70. Thus, in the present embodiment, the rotation speed of the odd-numbered level transmission shaft 40 and that of the even-numbered level transmission shaft 70 are forcibly made equal to each other by means of the coupling with the first synchronizing gear train 110 of the synchronizing speed change mechanism 100. As a result, it is possible to perform shift-up or shift-down while achieving synchronization mechanically.

On the other hand, for the synchronization at the time of shift-up or shift-down between the levels in which this output side gear is not shared (between the second and the third, between the fourth and the fifth, and between the sixth and the seventh), it is only necessary that rotations are made so that a rotation ratio between the odd-numbered level transmission speed change mechanism 100. As a result, it is possible to perform shift-up or shift-down while achieving synchronization mechanically.

In other words, in the sequential shift-ups or shift-downs from the first to the eighth, the need for complex rotational control or the like is eliminated by coupling the first synchronizing gear train 110 and the second synchronizing gear train 120 of the synchronizing speed change mechanism 100 alternately and selectively. As a result, there is no need to provide a sensor or the like in each shaft for synchronization control, and synchronization can be achieved mechanically only by means of ON and OFF operations of the synchronizing clutch.

A speed change operation of this transmission 1 will be described next. Note that it is assumed here that the input shaft 10 is being rotated by the diesel engine 2 at 1000 min$^{-1}$.

<Start of Driving in First from Stopped State>

Figure 2:
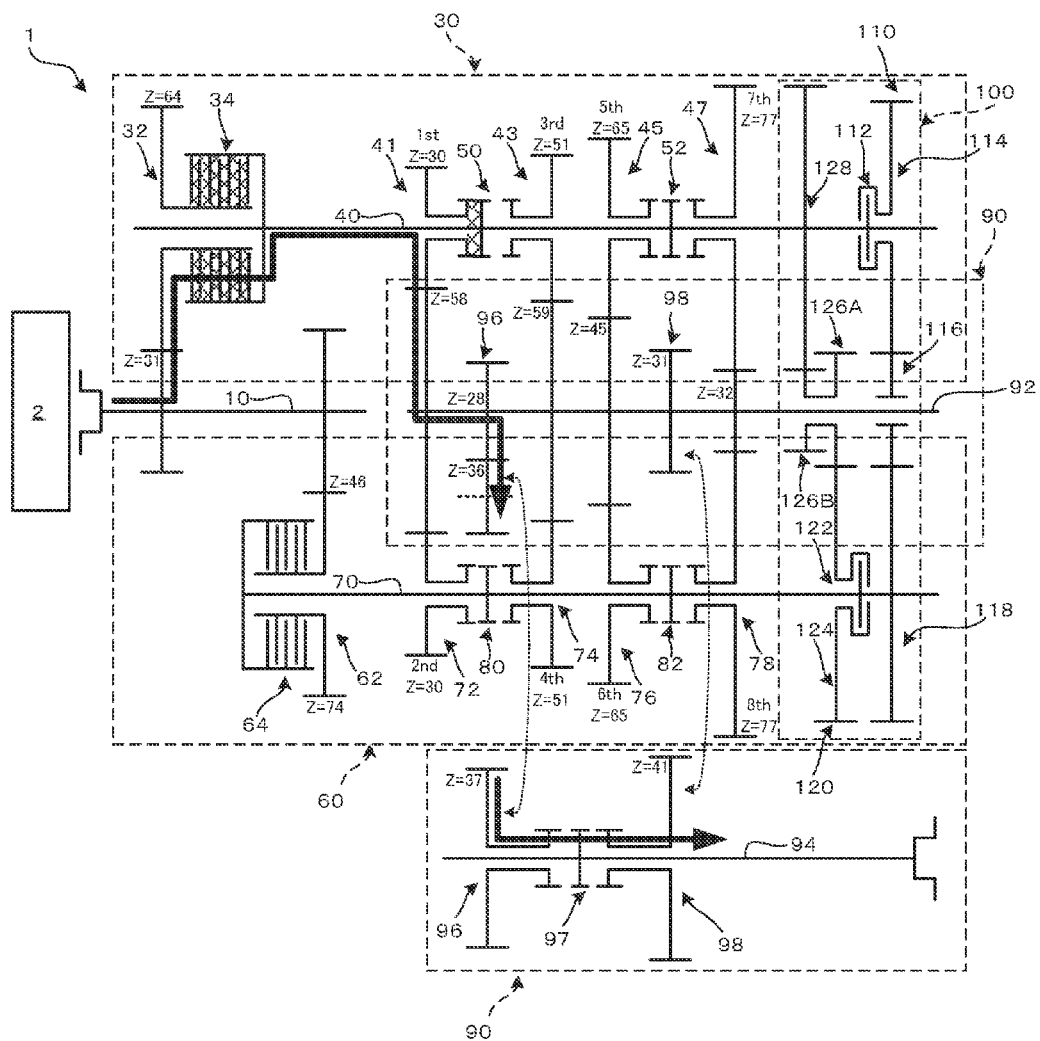
FIG. 2 is a diagram showing a torque flow in the first of the twin clutch transmission.

As shown in FIG. 2, first of all, the forward/reverse selecting mechanical clutch 97 is set in the "forward rotation coupled state" (the "reverse rotation coupled state" in the case of the operation of the reverse rotation) and the odd-numbered level mechanical clutch 50 is set in the "first coupled state." Then, instead of a torque converter, the odd-numbered level main clutch 34 is gradually coupled while being slid in a half clutch state, and the rotation of the input shaft 10 is thereby transmitted to the odd-numbered level transmission shaft 40 via the odd-numbered level transmission gear train 32. The odd-numbered level transmission shaft 40 is thereby rotated at about 484 min$^{-1}$. This rotation of the odd-numbered level transmission shaft 40 is transmitted to the counter shaft 92 via the first speed-changing gear train 41. As a result, the counter shaft 92 is rotated at 251 min$^{-1}$. This rotation of the counter shaft 92 is transmitted to the output shaft 94 via the forward rotation gear train 96 (the reverse rotation gear train 98 in the case of the operation of the reverse rotation).

<Preparation for Second During Operation in First>

Figure 3:
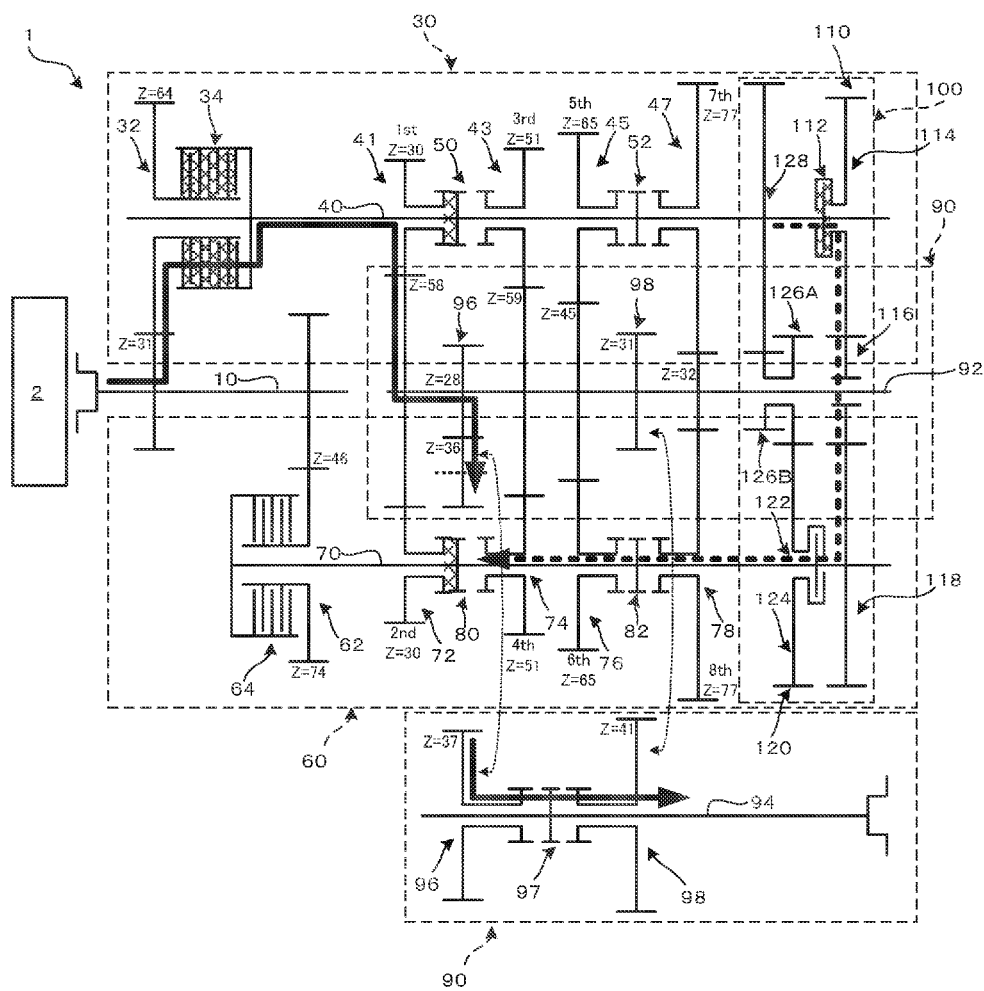
FIG. 3 is a diagram showing a torque flow for a preparation for the second of the twin clutch transmission.

While running in the first, the input gear of the second speed-changing gear train 72 in the even-numbered level speed change mechanism 60 (the gear on the side of the even-numbered level transmission shaft 70) is rotated at 484 min$^{-1}$ as with the first speed-changing gear train 41. In other words, in order to synchronize the input gear of the second speed-changing gear train 72 with the even-numbered level transmission shaft 70, it is only necessary that the even-numbered level transmission shaft 70 is rotated at 484 min$^{-1}$. Thus, as shown in FIG. 3, the rotation of the odd-numbered level transmission shaft 40 and that of the even-numbered level transmission shaft 70 are forcibly made at the same speed (ratio is 1) by coupling the first synchronizing gear train 110 of the synchronizing speed change mechanism 100. Due to this coupling of the first synchronizing gear train 110, the rotation speed is forcibly fixed to a value around 484 min$^{-1}$. Since the rotation of the even-numbered level transmission shaft 70 consequently becomes synchronous with that of the second speed-changing gear train 72, the even-numbered level mechanical clutch 80 can be coupled to achieve the "second coupled state." The preparation for the shift-up to the second is thereby completed.

<Shift-Up to Second from First>

Figure 4:
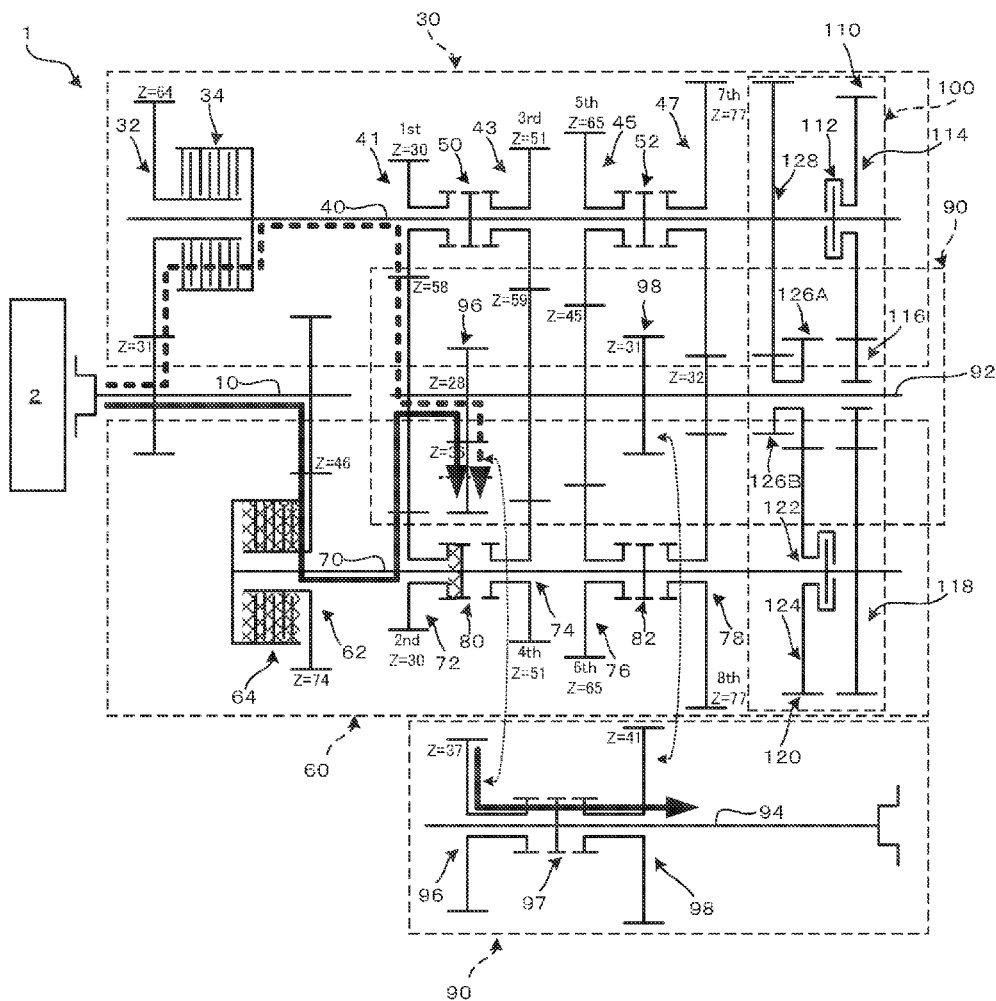
FIG. 4 is a diagram showing a torque flow in the second of the twin clutch transmission.

In order to shift up to the second, the first synchronizing gear train 110 is disengaged and the even-numbered level main clutch 64 is gradually coupled as shown in FIG. 4. Simultaneously with this operation, the odd-numbered level main clutch 34 is set in the "uncoupled state" and the rotation of the odd-numbered level transmission shaft 40 is thereby prevented from being transmitted to the counter shaft 92. As a result, the rotation of the even-numbered level transmission shaft 70 is increased to 622 min$^{--1}$ from 484 min$^{--1}$ in the half clutch state, and the rotation of the counter shaft 92 is increased to 321 min$^{-1}$. The shift-up to the second is thereby completed. As a preparation for the next shift, the odd-numbered level mechanical clutch 50 is set in the "uncoupled state" during the operation in the second.

<Preparation for Third During Operation in Second>

Figure 5:
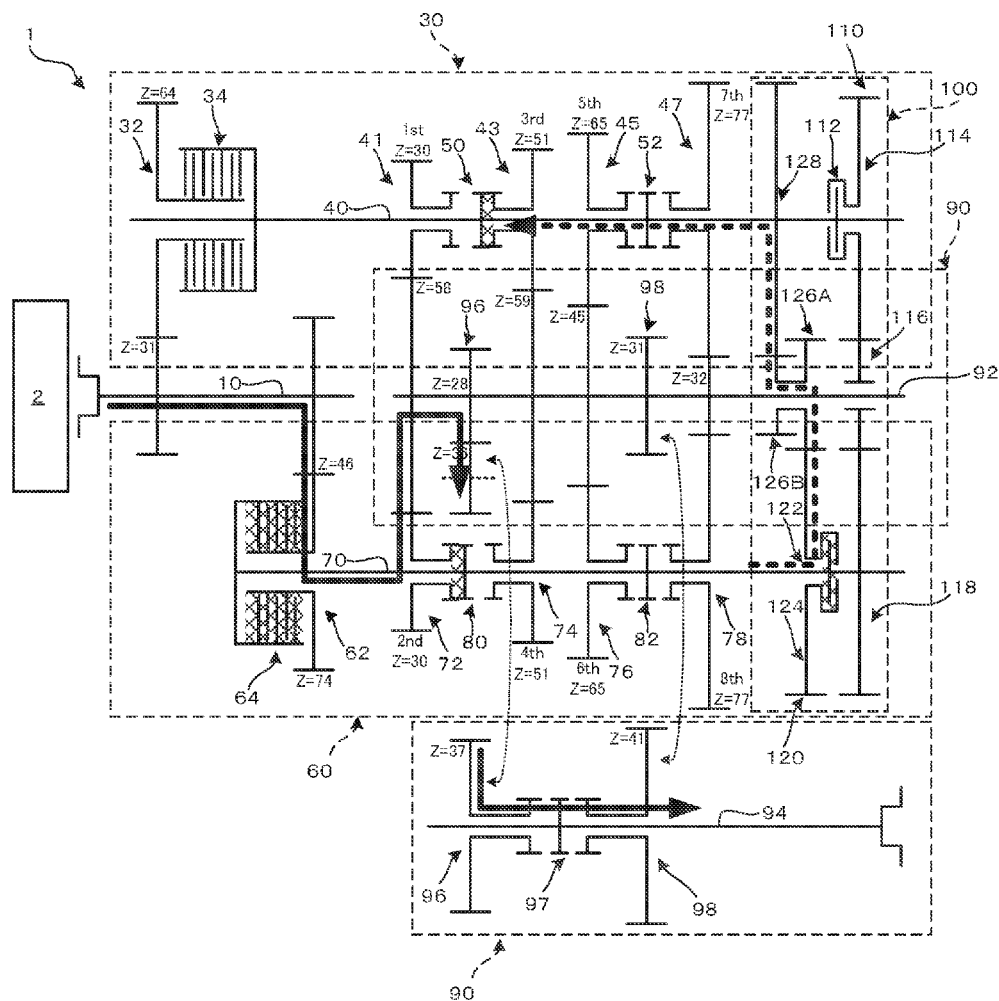
FIG. 5 is a diagram showing a torque flow for a preparation for the third of the twin clutch transmission.

While running in the second, the input gear of the third speed-changing gear train 43 in the odd-numbered level speed change mechanism 30 (the gear on the side of the odd-numbered level transmission shaft 40) is rotated at 371 min$^{--1}$ due to its rotation ratio. In other words, in order to synchronize the input gear of the third speed-changing gear train 43 with the odd-numbered level transmission shaft 40, it is only necessary that the odd-numbered level transmission shaft 40 is rotated at 371 min$^{-1}$. Thus, as shown in FIG. 5, the odd-numbered level transmission shaft 40 and the even-numbered level transmission shaft 70 are forcibly rotated at a ratio equal to the square of the above-described interlevel ratio (about 1.64) by coupling the second synchronizing gear train 120 of the synchronizing speed change mechanism 100. Due to this coupling of the second synchronizing gear train 120, the rotation of the odd-numbered level transmission shaft 70 is fixed to a value around 371 min$^{-1}$, which is a value obtained by dividing 622 min$^{-1}$, i.e., the rotation speed of the even-numbered level transmission shaft 70, by the square of the interlevel ratio. Since the rotation of the odd-numbered level transmission shaft 40 consequently becomes synchronous with that of the third speed-changing gear train 43, the odd-numbered level mechanical clutch 50 can be coupled to achieve the "third coupled state." The preparation for the shift-up to the third is thereby completed.

<Shift-Up to Third from Second>

Figure 6:
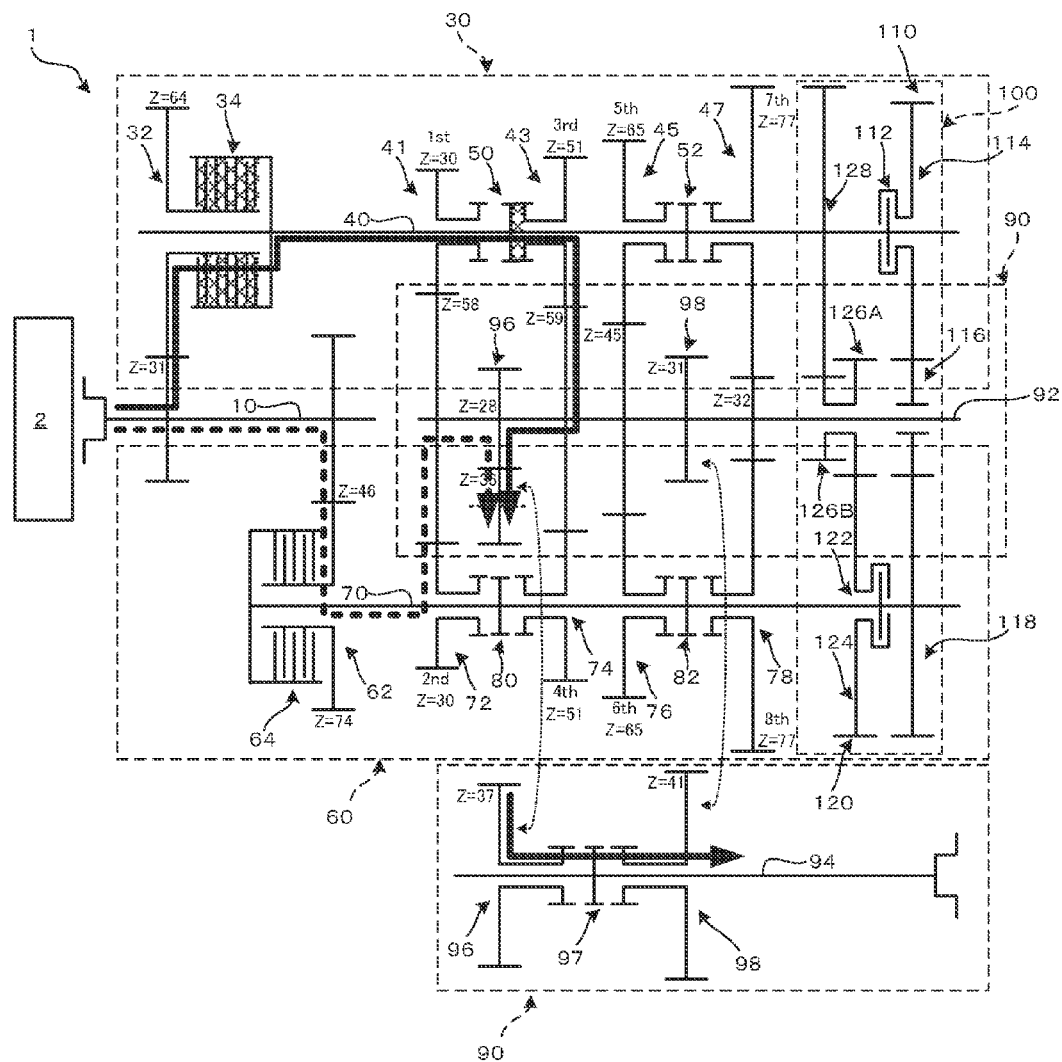
FIG. 6 is a diagram showing a torque flow in the third of the twin clutch transmission.

In order to shift up to the third, the second synchronizing gear train 120 is disengaged and the odd-numbered level main clutch 34 is gradually coupled as shown in FIG. 6. Simultaneously with this operation, the even-numbered level main clutch 64 is set in the "uncoupled state" and the rotation of the even-numbered level transmission shaft 70 is thereby prevented from being transmitted to the counter shaft 92. As a result, the rotation of the odd-numbered level transmission shaft 40 is increased to 484 min$^{-1}$ from 371 min$^{-1}$ in the half clutch state, and the rotation of the counter shaft 92 is increased to 418 min$^{-1}$. The shift-up to the third is thereby completed. As a preparation for the next shift, the even-numbered level mechanical clutch 80 is set in the "uncoupled state" during the operation in the third. Shift-ups to the fourth and subsequent gears are executed in the manner similar to that described above while achieving synchronization by coupling the first synchronizing gear train 110 and the second synchronizing gear train 120 in an alternate manner.

<Preparation for Second During Operation in Third>

Figure 7:
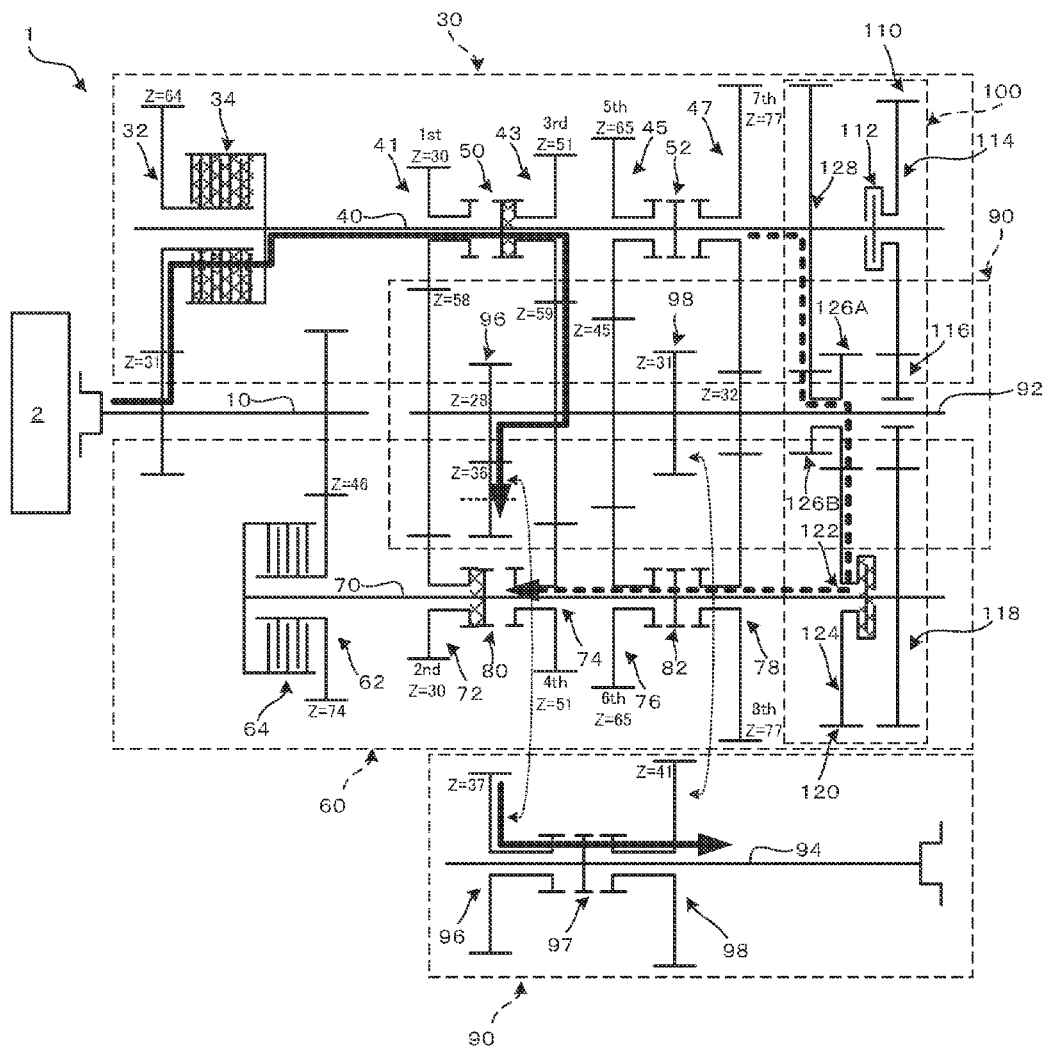
FIG. 7 is a diagram showing a torque flow for a preparation for the second of the twin clutch transmission.

In order to shift down to an operation in the second from an operation in the third, the second speed-changing gear train 72 is coupled with the even-numbered level transmission shaft 70 as a preparation therefor. More specifically, the rotation of the counter shaft 92 is made at 418 min$^{--1}$ and the rotation of the odd-numbered level transmission shaft 40 is made at 484 min$^{--1}$ during the operation in the third. Thus, the gear on the side of the even-numbered level transmission shaft 70 in the second speed-changing gear train 72 of the even-numbered level speed change mechanism 60 is rotated at 808 min$^{-1}$. Therefore, as shown in FIG. 7, the odd-numbered level transmission shaft 40 and the even-numbered level transmission shaft 70 are forcibly rotated at a ratio equal to the square of the above-described interlevel ratio (about 1.64) by coupling the second synchronizing gear train 120 of the synchronizing speed change mechanism 100. As a result, the rotation of the even-numbered level transmission shaft 70 can be increased temporarily up to 803 min$^{-1}$. Thus, the rotation of the even-numbered level transmission shaft 70 becomes approximately synchronous with that of the second speed-changing gear train 72, and the even-numbered level mechanical clutch 80 can be therefore coupled to achieve the "second coupled state." The preparation for the shift-down to the second is thereby completed.

<Shift-Down to Second from Third>

Figure 8:
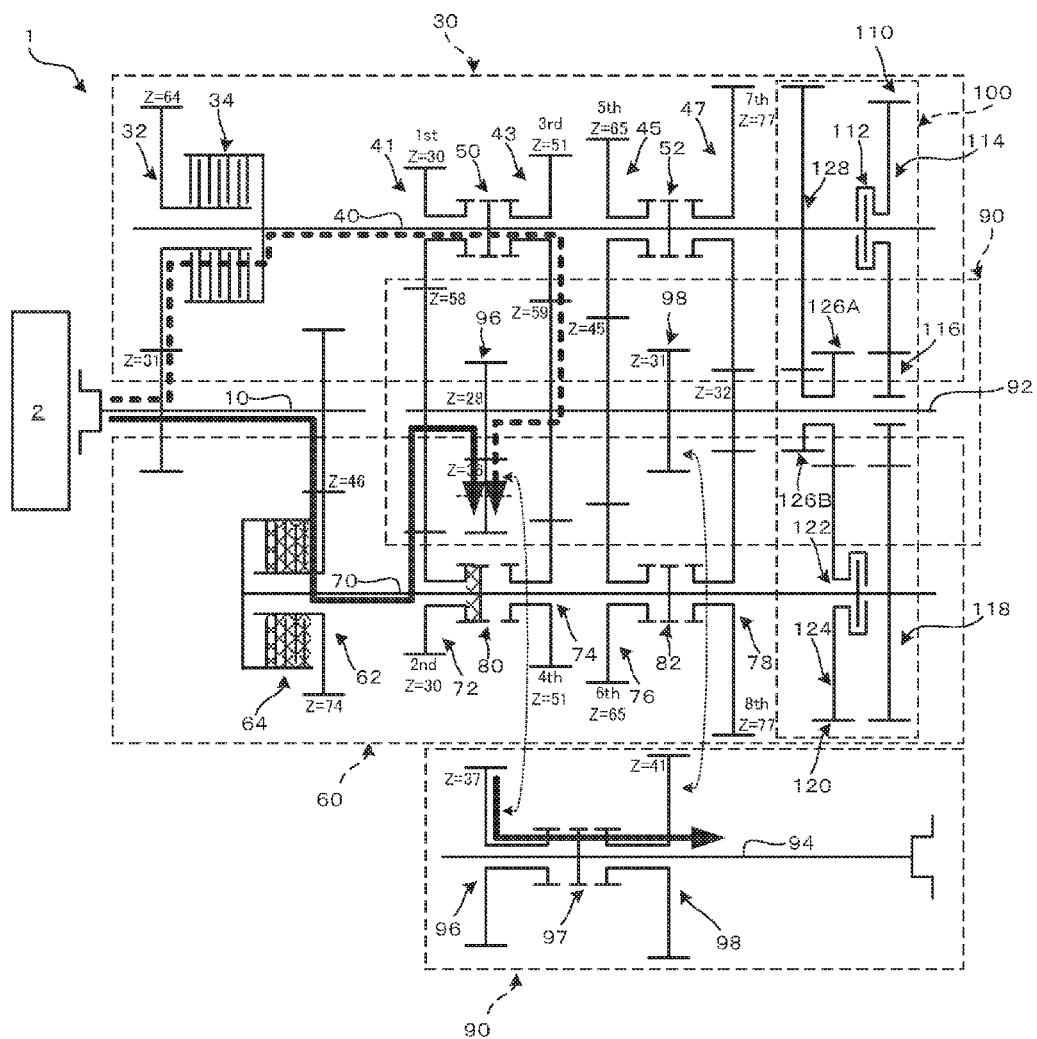
FIG. 8 is a diagram showing a torque flow in the second of the twin clutch transmission.

In order to shift down to the second, the even-numbered level main clutch 64 is gradually coupled while disengaging the second synchronizing gear train 120 as shown in FIG. 8. Simultaneously with this operation, the odd-numbered level main clutch 34 is set in the "uncoupled state" and the rotation of the odd-numbered level transmission shaft 40 is thereby prevented from being transmitted to the counter shaft 92. As a result, the rotation of the even-numbered level transmission shaft 70 is decreased down to 622 min$^{-1}$ from 803 min$^{-1}$, and the rotation of the counter shaft 92 is decreased down to 321 min$^{-1}$. The shift-down to the second is thereby completed. As a preparation for the next shift, the odd-numbered level mechanical clutch 50 is set in the "uncoupled state" during the operation in the second.

<Preparation for First During Operation in Second>

Figure 9:
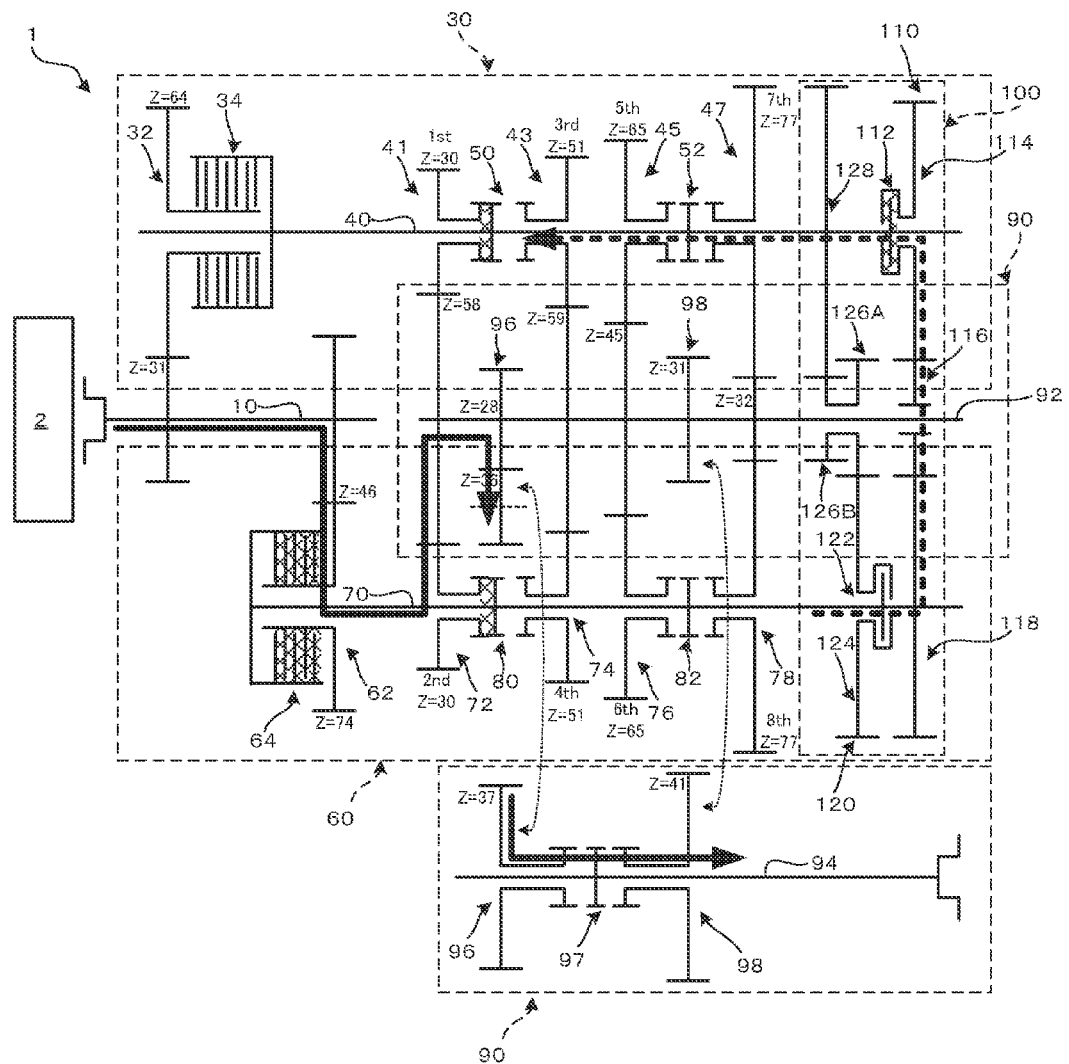
FIG. 9 is a diagram showing a torque flow for a preparation for the first of the twin clutch transmission.

In order to shift down to an operation in the first from an operation in the second, the first speed-changing gear train 41 is coupled with the odd-numbered level transmission shaft 40 as a preparation therefor. More specifically, the rotation of the counter shaft 92 is made at 321 min$^{-1}$ and the rotation of the even-numbered level transmission shaft 70 is made at 622 min$^{--1}$ during the operation in the second. Thus, the gear on the side of the odd-numbered level transmission shaft 40 in the first speed-changing gear train 41 is also rotated at 622 $min^{-1}$. Therefore, as shown in FIG. 9, the rotation of the odd-numbered level transmission shaft 40 is forcibly made equal to the rotation of the even-numbered level transmission shaft 70 by coupling the first synchronizing gear train 110 of the synchronizing speed change mechanism 100. As a result, the rotation of the odd-numbered level transmission shaft 40 is made at 622 $min^{-1}$, and the rotation of the odd-numbered level transmission shaft 40 therefore becomes approximately synchronous with that of the first speed-changing gear train 41. As a result, the odd-numbered level mechanical clutch 50 can be coupled to achieve the "first coupled state." The preparation for the shift-down to the first is thereby completed.

<Shift-Down to First from Second>

Figure 10:
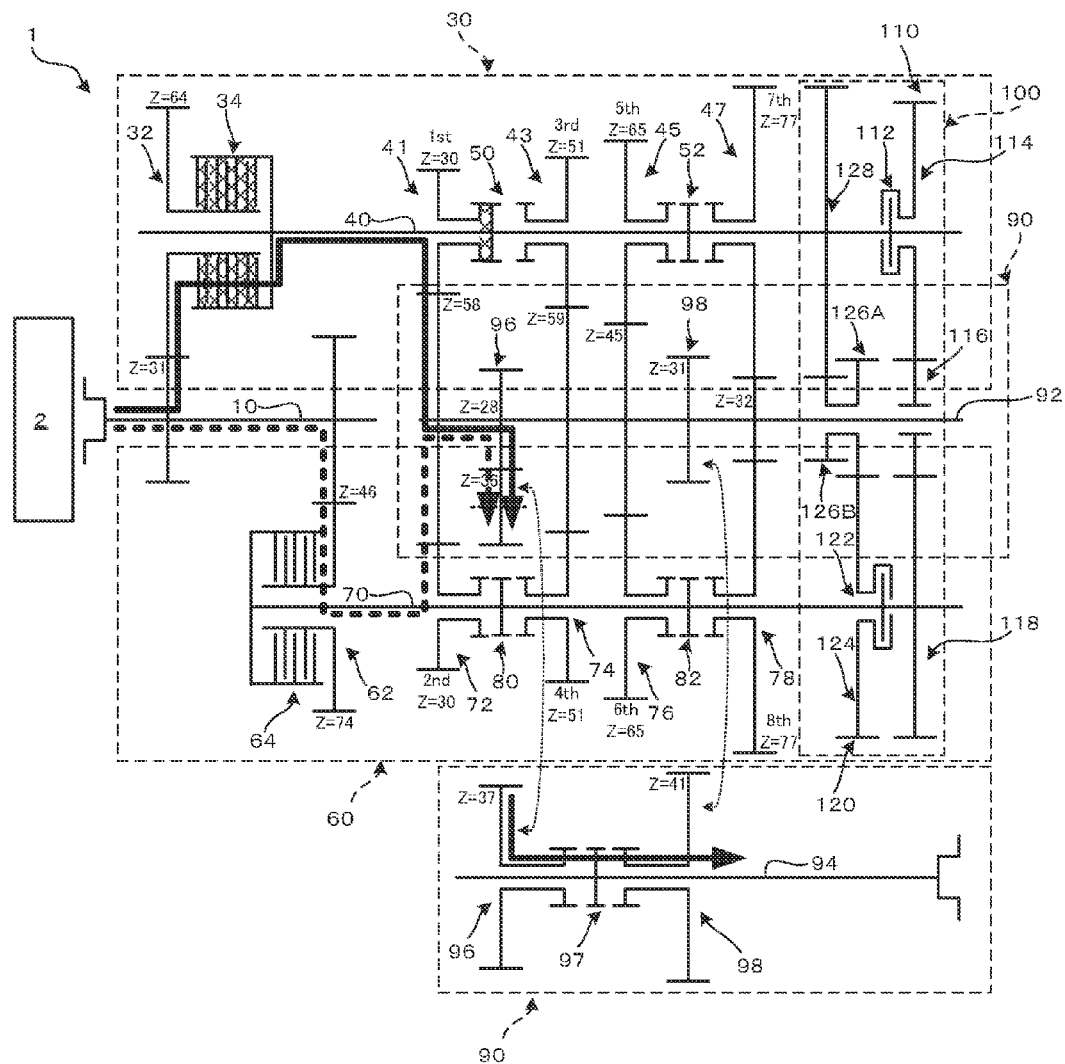
FIG. 10 is a diagram showing a torque flow in the first of the twin clutch transmission.

In order to shift down to the first, the odd-numbered level main clutch 34 is gradually coupled while disengaging the first synchronizing gear train 110 as shown in FIG. 10. Simultaneously with this operation, the even-numbered level main clutch 64 is set in the "uncoupled state" and the rotation of the even-numbered level transmission shaft 70 is thereby prevented from being transmitted to the counter shaft 92. As a result, the rotation of the odd-numbered level transmission shaft 40 is decreased down to 484 $min^{-1}$ from 622 $min^{-1}$, and the rotation of the counter shaft 92 is decreased down to 251 $min^{-1}$. The shift-down to the first is thereby completed. As a preparation for the next shift, the even-numbered level mechanical clutch 80 is set in the "uncoupled state" during the operation in the first.

As described above, the transmission 1 of the first embodiment includes the odd-numbered level speed change mechanism 30, the even-numbered level speed change mechanism 60, and the synchronizing speed change mechanism 100. Consequently, by utilizing the synchronizing gear train of the synchronizing speed change mechanism 100 and the synchronizing clutch selectively coupling this synchronizing gear train when preparing for a speed change to the adjacent speed-changing level, it becomes possible to mechanically synchronize the rotation of the odd-numbered level transmission shaft 40 and that of the even-numbered level transmission shaft 70. Therefore, it is possible to perform a shift-up or a shift-down in a stable manner. Thus, without performing a complex control used with braking by a half clutch state or a synchronizing brake, or the like, it becomes possible to synchronize the odd-numbered level transmission shaft 40 with the even-numbered level transmission shaft 70 due to the coupling of the synchronizing gear train and to couple the speed-changing gear train by utilizing the mechanical clutch. As compared to the multiplate wet clutch, the mechanical clutch can significantly enhance the transmission efficiency during the operation thereof due to its dramatically-reduced idling loss in the uncoupled state thereof.

According to this transmission 1, for example, when performing a shift-up, the synchronizing speed change mechanism 100 performs a control for temporarily decelerating the rotation of the preparation-side transmission shaft 40 or 70 as compared to the natural rotation speed thereof so as to be in synchronization with that of the speed-changing gear train. Then, the transmission shaft 40 or 70 is coupled with the speed-changing gear train by the mechanical clutch. Thereafter, the shift-up is completed by increasing the rotation speed of the transmission shaft 40 or 70 to the natural rotation speed thereof. When performing a shift-down, on the other hand, the synchronizing speed change mechanism 100 temporarily accelerates the rotation of the preparation-side transmission shaft 40 or 70 so as to be in synchronization with that of the speed-changing gear train. Then, the transmission shaft 40 or 70 is coupled with the speed-changing gear train by the mechanical clutch. Thereafter, the shift-down is completed by changing the coupled state of the main clutch 34 or 36.

As can be seen from the above description, the preparation for a speed change can be done in this transmission 1 only by selectively coupling the synchronizing gear train. Thus, the synchronizing operations during a shift-up and during a shift-down can be made substantially the same. As a result, the configuration of the transmission 1 and the control thereof are simplified, and it also becomes possible to configure the transmission 1 in a compact manner. Especially at the time of a down-shift, the rotation speed of the transmission shaft 40 or 70 is temporarily increased by the coupling of the synchronizing gear train in the synchronizing speed change mechanism 100. As a result, there is no need to temporarily increase the rotation speed of the diesel engine 2 for synchronization, thereby leading to a reduction in the noise of the diesel engine 2. Moreover, the durability and fuel efficiency of the diesel engine 2 and the transmission 1 can be improved synergistically.

Moreover, according to this transmission 1, speed changes are performed by utilizing the first synchronizing gear train 110 between the first and the second, between the third and the fourth, between the fifth and the sixth, and between the seventh and the eighth, whereas speed changes are performed by utilizing the second synchronizing gear train 120 between the second and the third, between the fourth and the fifth, and between the sixth and the seventh. By alternately using the two synchronizing gear trains 110 and 120 in this manner, burden on the synchronizing gear trains 110 and 120 can be distributed. Moreover, the synchronizing operation can be performed in combination of the first rotation ratio and the second rotation ratio. Thus, even if the number of speed levels in the odd-numbered level speed change mechanism 30 and the even-numbered level speed change mechanism 60 is increased, they can be used as they are. Accordingly, a degree of freedom in gear ratio selection can be enhanced.

Furthermore, according to this transmission 1, gear ratios are made approximately equal to each other between adjacent speed-changing gear trains, for example, between the first speed-changing gear train 41 and the second speed-changing gear train 72. As a result, it becomes possible to employ the same gear and to share the gear of the counter shaft 92 between the first speed-changing gear train 41 and the second speed-changing gear train 72. The sharing of the gear allows the size of the transmission 1 in an axial direction thereof to be substantially at the level of a four-level configuration regardless of its eight-level configuration. Thus, it is also possible to significantly downsize the transmission 1.

Moreover, as already explained with regard to Table 1, the interlevel ratios from the first to the eighth are unified to be all about 1.29 in this transmission 1. As a result, the types of rotation ratio required to achieve synchronization by the synchronizing speed change mechanism 100 can be reduced (herein, only two kinds, i.e., the first rotation ratio and the second rotation ratio). Thus, the configuration thereof can be simplified. With a conventional mechanical transmission, for example, it was necessary to provide a synchronizer such as a synchromesh in each speed level. With this transmission 1, however, the synchronizing speed change mechanism 100 can perform a synchronization control for every speed change. As a result, it is possible to obtain a simplified and downsized configuration of the transmission.

Moreover, it is also preferred to add a rotation ratio for a jumping speed change to the synchronizing gear trains of the synchronizing speed change mechanism. Such an addition enables the operation of a jumping speed change, thereby being an effective means for reducing a speed change control time in a transmission with a large number of speed levels.

Especially in the present embodiment, the rotation ratio of the even-numbered level transmission shaft 70 with respect to the odd-numbered level transmission shaft 40, i.e., a rate (ratio) between the rotation ratio of the odd-numbered level transmission gear train 32 and the rotation ratio of the even-numbered level transmission gear train 62 is made to approximately coincide with the interlevel ratio of 1.29. As a result, as mentioned above, the gear ratios of the speed-changing gear trains in adjacent speed change levels can be made approximately equal to each other as in the gear ratios of the first speed-changing gear train 41 and the second speed-changing gear train 72, for example. This is because the desired interlevel ratio can be ensured by the rotation ratio between the odd-numbered level transmission gear train 32 and the even-numbered level transmission gear train 62 (equal to the interlevel ratio). Thus, between levels with approximately equal gear ratios of the speed-changing gear trains in the odd-numbered level speed change mechanism 30 and the even-numbered level speed change mechanism 60 (between the first and the second, between the third and the fourth, between the fifth and the sixth, and between the seventh and the eighth), a synchronization control can be performed by the first synchronizing gear train 110 in which the first rotation ratio is set to "approximately 1."

On the other hand, a ratio between the gear ratio of the second speed-changing gear train 72 and that of the third speed-changing gear train 43 is set to be approximately the square (1.66) of the interlevel ratio (1.29). Thus, between these levels (between the second and the third, between the fourth and the fifth, and between the sixth and the seventh), a synchronization control can be performed by the second synchronizing gear train 120 in which the second rotation ratio is set to "the square of the interlevel ratio."

Moreover, according to this transmission 1, since there is no need to use a torque converter, it becomes possible to enhance the transmission efficiency thereof by avoiding a transmission loss caused by the torque converter at the time of a low-speed operation thereof. Moreover, in the case of the torque converter, an internal loss is generated also at the time of the lock-up thereof during its high-speed operation due to the collision of oil present inside the converter against its blade. However, since the transmission 1 eliminates the need for the torque converter in the first place, it is possible to enhance the transmission efficiency thereof during its high-speed operation. Moreover, it is only required to provide the multiplate wet clutches in the transmission 1 at four positions (the main clutches 34 and 64, and the first and second synchronizing clutches 112 and 122 having a small capacity). Also, the main clutch having a large capacity has a small relative rotational difference even if the clutch is set in the "uncoupled state." Thus, it is possible to keep the idling loss thereof small. As a result, the transmission efficiency thereof can be further enhanced. Furthermore, since the heat generation of the multiplate wet clutch is also suppressed, it is possible to eliminate the need for a radiator for cooling oil. This also leads to an improvement in the durability of each multiplate wet clutch.

Although the case where the mechanism for switching between the forward rotation and the reverse rotation is provided in the output mechanism 90 is illustrated above with the transmission 1 of the first embodiment, the present invention is not limited thereto. For example, according to a transmission 1 shown in FIG. 11, the mechanism for switching between the forward rotation and the reverse rotation is incorporated on the side of the input shaft 10. More specifically, this transmission 1 includes: an odd-numbered level transmission gear train 32A and an even-numbered level transmission gear train 62A placed coaxially with the input shaft 10; a reverse rotation side main gear 25 coaxially placed on the input shaft 10; and a forward/reverse selecting mechanical clutch 24 placed on the input shaft 10. This forward/reverse selecting mechanical clutch 24 can select between a "forward rotation state" in which the odd-numbered level transmission gear train 32A and the even-numbered level transmission gear train 62A are coupled to the input shaft 10 and a "reverse rotation state" in which the reverse rotation side main gear 25 is coupled to the input shaft 10.

Furthermore, this transmission 1 includes: an odd-numbered level first idler gear 23A to be meshed with the reverse rotation side main gear 25; and an odd-numbered level second idler gear 23B to be coaxially rotated together with the odd-numbered level idler gear 23A and to be meshed with the odd-numbered level transmission gear train 32. This transmission 1 further includes: an even-numbered level first idler gear 26A to be meshed with the reverse rotation side main gear 25; and an even-numbered level second idler gear 26B to be coaxially rotated together with the even-numbered level first idler gear 26 and to be meshed with the even-numbered level transmission gear train 62.

Figure 12:
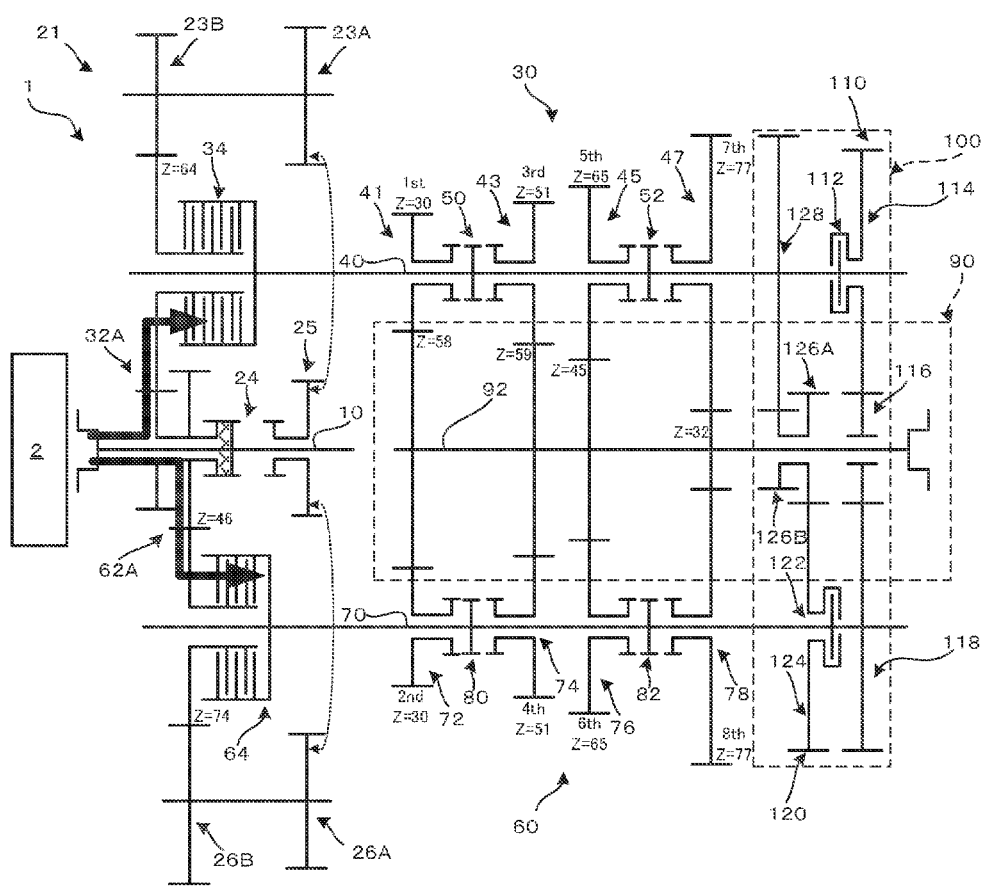
FIG. 12 is a diagram showing a torque flow of the twin clutch transmission during a forward rotation.

Thus, as shown in FIG. 12, in the case of the "forward rotation state," the rotation of the input shaft 10 is transmitted to the odd-numbered level main clutch 34 through the odd-numbered level transmission gear train 32A or transmitted to the even-numbered level main clutch 64 through the even-numbered level transmission gear train 62A.

Figure 13:
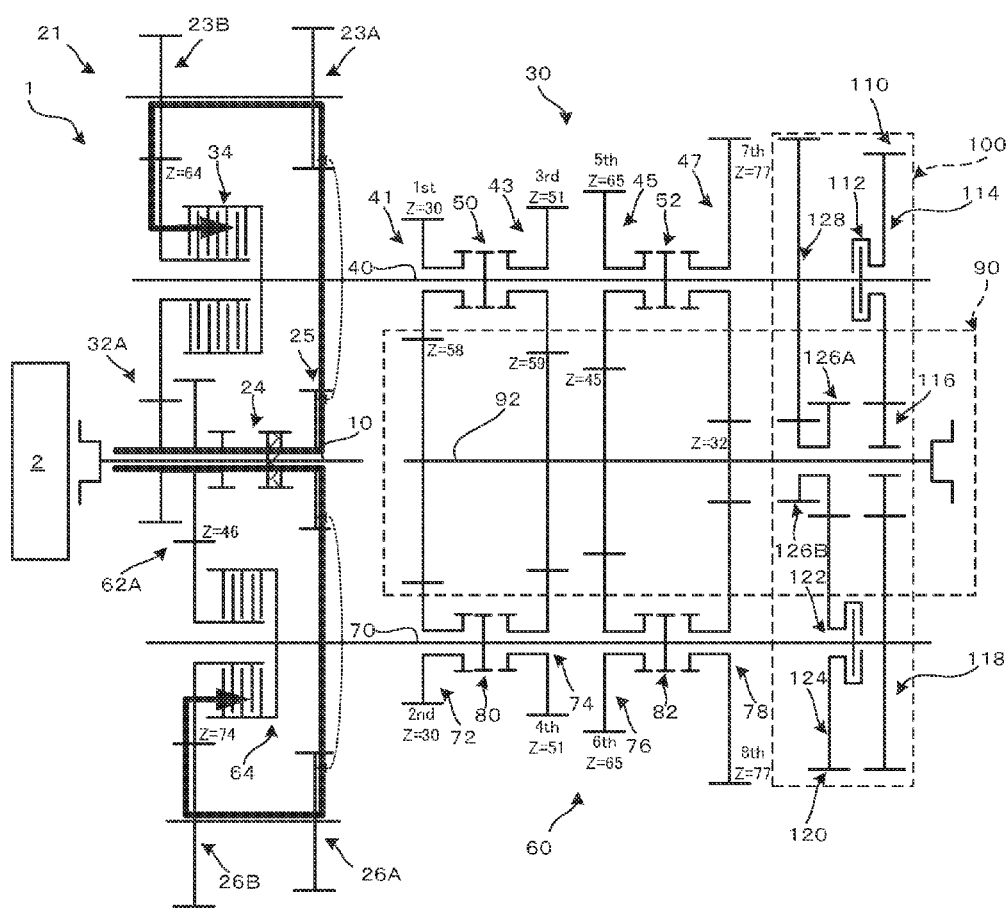
FIG. 13 is a diagram showing a torque flow of the twin clutch transmission during a reverse rotation.

On the other hand, as shown in FIG. 13, in the case of the "reverse rotation state," the rotation of the input shaft 10 is transmitted to the odd-numbered level main clutch 34 through the reverse rotation side main gear 25, the odd-numbered level first idler gear 23A, the odd-numbered level second idler gear 23B, and the odd-numbered level transmission gear train 32A. Similarly, the rotation of the input shaft 10 is transmitted to an odd-numbered level synchronizing clutch 38 through the reverse rotation side main gear 25, the even-numbered level first idler gear 26, the even-numbered level second idler gear 26B, and an odd-numbered level synchronizing gear train 22.

By incorporating the mechanism capable of selecting between the forward rotation and the reverse rotation on the input side as in this transmission 1, it becomes easy to coaxially place the input shaft 10 and the output shaft 92 of the output mechanism 90.

The switching operation between the forward rotation and the reverse rotation is performed while a vehicle is at a stop. In the present embodiment, however, since the forward/reverse selecting mechanical clutch is placed on the input shaft directly connected to the engine, it is necessary to perform the switching operation after the engine is stopped.

Figure 11:
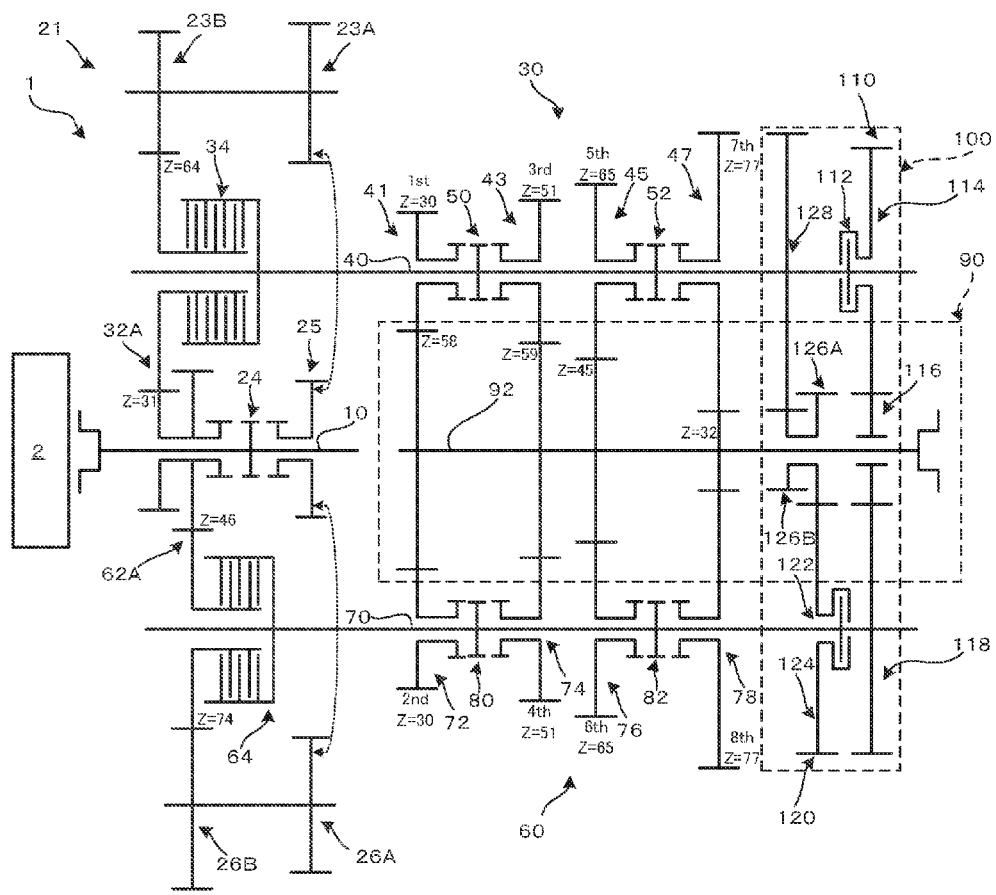
FIG. 11 is a skeleton diagram showing an entire configuration of the twin clutch transmission according to another example of the present embodiment.
Figure 14:
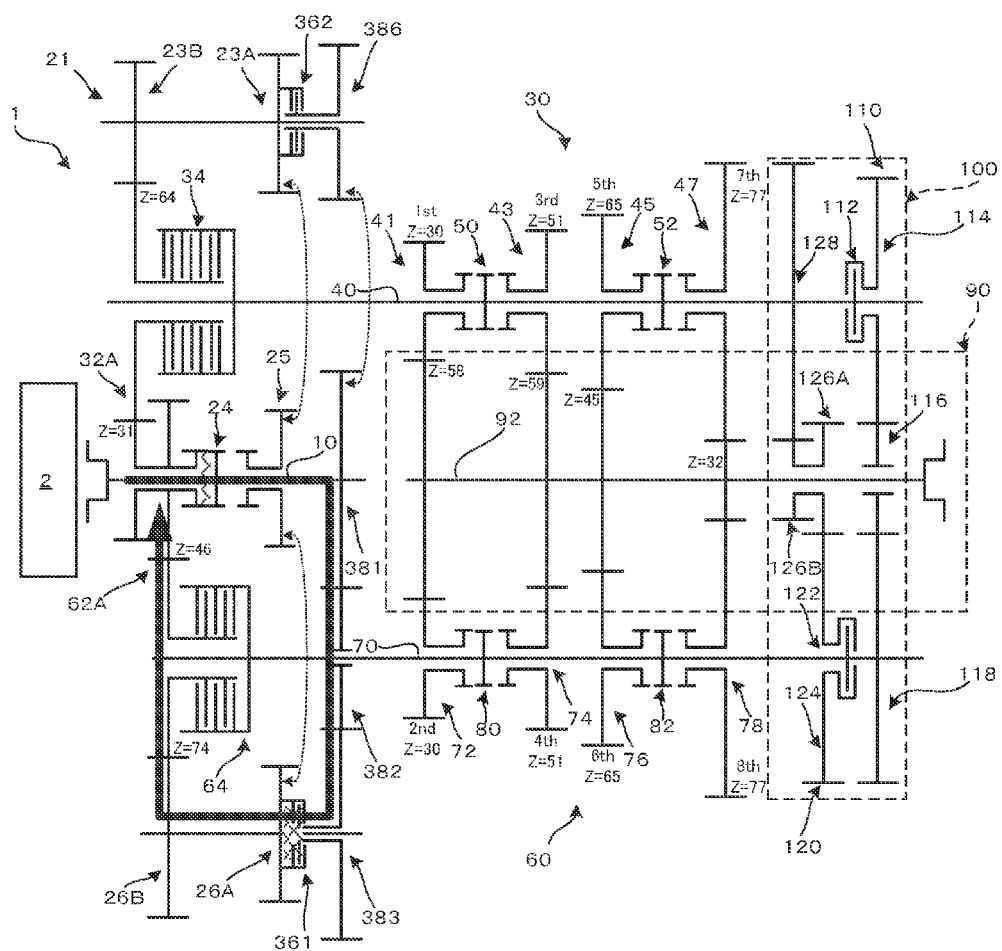
FIG. 14 is a schematic cross-sectional view showing a synchronization mechanism for switching between forward and backward movements of the twin clutch transmission.
Figure 15:
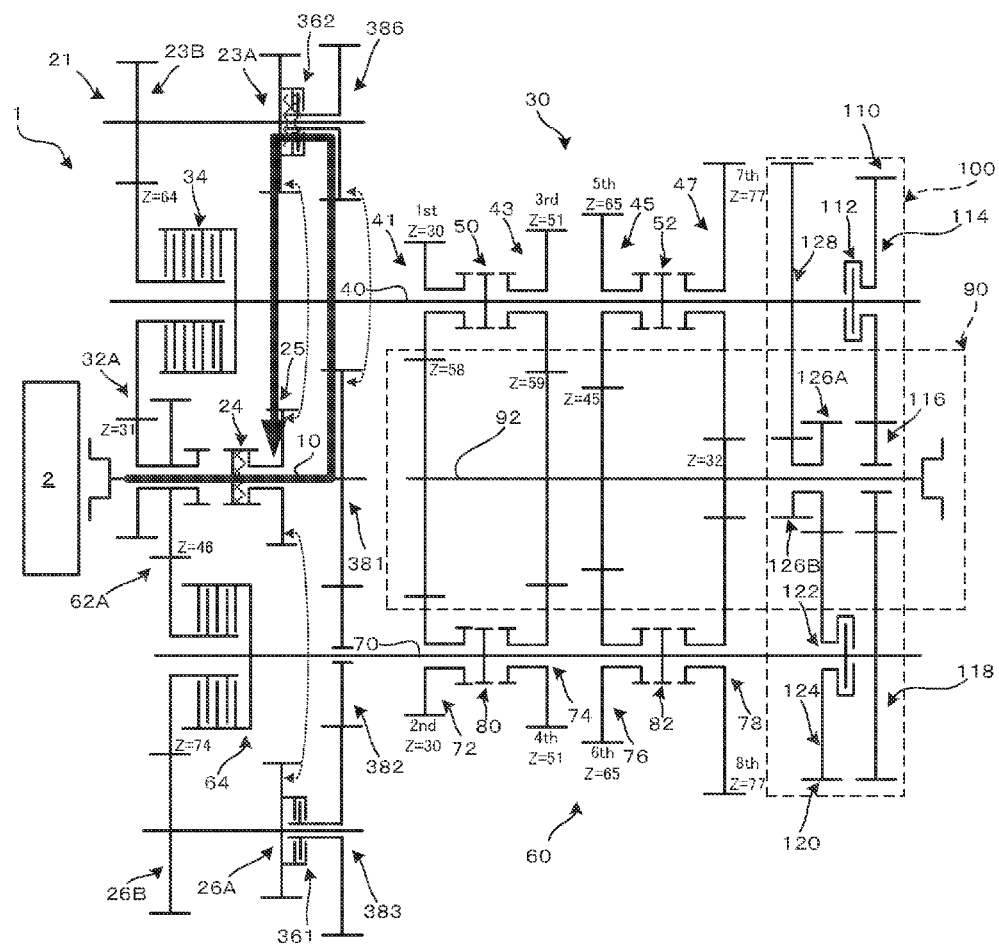
FIG. 15 is a schematic cross-sectional view showing a synchronization mechanism for switching between forward and backward movements of the twin clutch transmission.

FIGS. 14 and 15 illustrate a case further including, in the transmission 1 described with FIG. 11, a forward/reverse switching synchronization mechanism 350 for achieving the switching between the forward rotation and the reverse rotation in a state where the engine is being operated. The forward/reverse switching synchronization mechanism 350 includes: a forward/reverse switching synchronization gear 381 placed on the input shaft 10; a forward rotation synchronizing clutch 361 and a forward rotation synchronizing gear 383 placed on the side of the even-numbered level first idler gear 26A; a reverse rotation synchronizing clutch 362 and a reverse rotation synchronizing gear 386 placed on the side of the odd-numbered level first idler gear 23A; and an intermediate idler gear 382 interposed between the forward/reverse switching synchronization gear 381 and the forward rotation synchronizing gear 383.

The forward/reverse switching synchronization gear 381 is coupled with the input shaft 10 so as to derive a power for synchronization from the input shaft 10. The forward rotation synchronizing gear 383 meshes with the forward/reverse switching synchronization gear 381 via the intermediate idler gear 382 so as to derive a power for forward rotation synchronization. This forward rotation synchronization power is transmitted to the side of the even-numbered level first idler gear 26A via the forward rotation synchronizing clutch 361. The reverse rotation synchronizing gear 386 meshes with the forward/reverse switching synchronization gear 381 so as to derive a power for reverse rotation synchronization (having a rotation reverse to the forward rotation synchronization power). This reverse rotation synchronization power is transmitted to the side of the odd-numbered level first idler gear 23A via the reverse rotation synchronizing clutch 362.

In order to switch the forward/reverse selecting mechanical clutch 24 to the "forward rotation coupled state" while the engine is being operated in a state where the vehicle is at a stop, the forward rotation synchronizing clutch 361 is coupled so as to derive the forward rotation synchronization power, and this power is transmitted to the even-numbered level transmission gear train 62A via the even-numbered level second idler gear 26B as shown in FIG. 14. As a result, synchronization between the even-numbered level transmission gear train 62A and the input shaft 10 is achieved, thereby being able to switch the forward/reverse selecting mechanical clutch 24 to the "forward rotation coupled state." Note that the forward rotation synchronizing clutch 361 is disengaged after the completion of the coupling of the forward/reverse selecting mechanical clutch 24.

In order to switch the forward/reverse selecting mechanical clutch 24 to the "reverse rotation coupled state" while the engine is being operated in a state where the vehicle is at a stop, the reverse rotation synchronizing clutch 362 is coupled so as to derive the reverse rotation synchronization power, and this power is transmitted to the reverse rotation side main gear 25 via the odd-numbered level first idler gear 23A as shown in FIG. 15. As a result, synchronization between the reverse rotation side main gear 25 and the input shaft 10 is achieved, thereby being able to switch the forward/reverse selecting mechanical clutch 24 to the "reverse rotation coupled state." Note that the reverse rotation synchronizing clutch 362 is disengaged after the completion of the coupling of the reverse rotation selecting mechanical clutch 24. By providing the forward/reverse switching synchronization mechanism 350 as described above, it becomes possible to perform the switching between the forward rotation and the reverse rotation without stopping the engine.

Next, with reference to FIG. 16 and the subsequent drawings, a transmission 501 according to the second embodiment of the present invention suitable for installation in a diesel railcar will be described in detail. Note that a case where the output shaft is rotated in a first direction is defined as a forward movement and a case where it is rotated in a second direction is defined as a backward movement according to this transmission 501. Furthermore, whereas the odd-numbered level speed change mechanism in the transmission 501 performs a speed change for an odd-numbered level during the forward movement, it performs a speed change for an even-numbered level during the backward movement. Similarly, whereas the even-numbered level speed change mechanism in the transmission 501 performs a speed change for an even-numbered level during the forward movement, it performs a speed change for an odd-numbered level during the backward movement. Therefore, for convenience of explanation, the "odd-numbered level" and the "even-numbered level" during the forward movement are employed as names for components or members. Moreover, for convenience of explanation, speed-changing gear trains and speed-changing gear mechanical clutches placed on the "odd-numbered levels" during the forward movement are sometimes referred to as a "first group" of speed-changing gear trains and a "first group" of speed-changing gear mechanical clutches. Similarly, speed-changing gear trains and speed-changing gear mechanical clutches placed on the "even-numbered levels" during the forward movement are sometimes referred to as a "second group" of speed-changing gear trains and a "second group" of speed-changing gear mechanical clutches.

The transmission 501 is to be installed in a diesel railcar and includes an input shaft 502 to which a power of an engine 510 (hereinafter, referred to also as an engine torque) is inputted; odd-numbered level and even-numbered level transmission shafts 503 and 504; and an output shaft 505 for outputting a power to wheels of a diesel railcar.

Disposed on the input shaft 502 are two main clutches 511 and 512 respectively for the odd-numbered levels and the even-numbered levels. Also, an odd-numbered level input gear 521 is disposed on the output side of the odd-numbered level main clutch 511, and an even-numbered level input gear 522 is disposed on the output side of the even-numbered level main clutch 512.

An odd-numbered level transmission gear 531 to be meshed with the odd-numbered level input gear 521 and an odd-numbered level reverse rotation transmission gear 552 are disposed on the odd-numbered level transmission shaft 503 in a rotatable manner. The odd-numbered level reverse rotation transmission gear 552 meshes with the even-numbered level input gear 522 via an odd-numbered level reverse rotation idler gear 542 provided on an odd-numbered level reverse rotation idler shaft 542*a*. An odd-numbered level transmission gear train is formed by the odd-numbered level input gear 521 and the odd-numbered level transmission gear train 531. Also, an odd-numbered level reverse rotation transmission gear train is formed by the odd-numbered level reverse rotation transmission gear 552, the odd-numbered level reverse rotation idler gear 542, and the even-numbered level input gear 522.

Similarly, an even-numbered level transmission gear 532 to be meshed with the even-numbered level input gear 522 and an even-numbered level reverse rotation transmission gear 551 are disposed on the even-numbered level transmission shaft 504 in a rotatable manner. The even-numbered level reverse rotation transmission gear 551 meshes with the odd-numbered level input gear 521 via an even-numbered level reverse rotation idler gear 541 provided on an even-numbered level reverse rotation idler shaft 541*a*. An even-numbered level transmission gear train is formed by the even-numbered level input gear 522 and the even-numbered level transmission gear 532. Also, an even-numbered level reverse rotation transmission gear train is formed by the even-numbered level reverse rotation transmission gear 551, the even-numbered level reverse rotation idler gear 541, and the odd-numbered level input gear 521.

Since the odd-numbered level input gear 521 is shared for the purpose of the reverse rotation of the even-numbered level transmission shaft 504 and the even-numbered level input gear 522 is shared for the purpose of the reverse rotation of the odd-numbered level transmission shaft 503 as described above, a length of the transmission 501 in the axial direction thereof is significantly reduced.

Moreover, disposed on the odd-numbered level transmission shaft 503 is an odd-numbered level forward/reverse switching mechanical clutch 561 for selectively coupling the odd-numbered level transmission gear 531 or the odd-numbered level reverse rotation transmission gear 552 with the odd-numbered level transmission shaft 503.

Similarly, disposed on the even-numbered level transmission shaft 504 is an even-numbered level forward/reverse switching mechanical clutch 562 for selectively coupling the even-numbered level transmission gear 532 or the even-numbered level reverse rotation transmission gear 551 with the even-numbered level transmission shaft 504.

Furthermore, a first group of speed-changing gear trains 571, 573, 575, and 577 that receive a power transmitted from the input shaft 502 and transmit the power to the output shaft 505 are disposed on the odd-numbered level transmission shaft 503 in a rotatable manner, and a first group of speed-changing gear mechanical clutches 581 and 583 for selectively coupling the first group of speed-changing gear trains 571, 573, 575, and 577 with the odd-numbered level transmission shaft 503 are also disposed thereon.

More specifically, the first group of speed-changing gear trains 571, 573, 575, and 577 are gear trains functioning as odd-numbered level gear trains during the forward movement and functioning as even-numbered level gear trains during the backward movement. Starting from the side of the engine 510, they are arranged in the order from a lower-speed gear to a higher-speed gear (the first gear→the third gear→the fifth gear→the seventh gear during the forward movement, and the second gear→the fourth gear→the sixth gear→the eighth gear during the backward movement).

Moreover, the speed-changing gear mechanical clutch 581 is placed on the odd-numbered level transmission shaft 503 between the speed-changing gear 571 and the speed-changing gear 573. The speed-changing gear mechanical clutch 583 is placed on the odd-numbered level transmission shaft 503 between the speed-changing gear 575 and the speed-changing gear 577.

The first group of speed-changing gear mechanical clutches 581 and 583 each perform an engagement and an disengaging by meshing a claw of a sleeve to be shifted with one of claws 571a, 573a, 575a, and 577a respectively provided in the gears of the first group of speed-changing gear trains 571, 573, 575, and 577 on a spline provided on the odd-numbered level transmission shaft 503.

Similarly, a second group of speed-changing gear trains 572, 574, 576, and 578 that receive a power transmitted from the input shaft 502 and transmit the power to the output shaft 505 are disposed on the even-numbered level transmission shaft 504 in a rotatable manner, and a second group of speed-changing gear mechanical clutches 582 and 584 for selectively coupling the second group of speed-changing gear trains 572, 574, 576, and 578 with the even-numbered level transmission shaft 504 are also disposed thereon.

More specifically, the second group of speed-changing gear trains 572, 574, 576, and 578 are gear trains functioning as even-numbered level gear trains during the forward movement and functioning as odd-numbered level gear trains during the backward movement. Starting from the side of the engine 510, they are arranged in the order from a lower-speed gear to a higher-speed gear (the second gear→the fourth gear→the sixth gear→the eighth gear during the forward movement, and the first gear→the third gear→the fifth gear→the seventh gear during the backward movement).

Moreover, the speed-changing gear mechanical clutch 582 is placed on the even-numbered level transmission shaft 504 between the speed-changing gear 572 and the speed-changing gear 574. The speed-changing gear mechanical clutch 584 is placed on the even-numbered level transmission shaft 504 between the speed-changing gear 576 and the speed-changing gear 578.

The second group of speed-changing gear mechanical clutches 582 and 584 each perform an engagement and an disengaging by meshing a claw of a sleeve to be shifted with one of claws 572a, 574a, 576a, and 578a respectively provided in the gears of the second group of speed-changing gear trains 572, 574, 576, and 578 on a spline provided on the even-numbered level transmission shaft 504.

A first output gear 591 meshing with both of the speed-changing gear 571 and the speed-changing gear 572, a second output gear 592 meshing with both of the speed-changing gear 573 and the speed-changing gear 574, a third output gear 593 meshing with both of the speed-changing gear 575 and the speed-changing gear 576, and a fourth output gear 594 meshing with both of the speed-changing gear 577 and the speed-changing gear 578 are disposed on the output shaft 505 while being fixed thereto.

Two of the speed-changing gears 571 to 578 meshing with the same one of the output gears 591 to 594, i.e., the speed-changing gear 571 and the speed-changing gear 572 meshing with the first output gear 591, the speed-changing gear 573 and the speed-changing gear 574 meshing with the second output gear 592, the speed-changing gear 575 and the speed-changing gear 576 meshing with the third output gear 593, and the speed-changing gear 577 and the speed-changing gear 578 meshing with the fourth output gear 594, are each designed to have the same number of teeth. Thus, a change gear ratio in the first group of speed change levels and that in the second group of speed change levels are equal to each other.

An odd-numbered level speed change mechanism is configured by the above-described odd-numbered level main clutch 511, the odd-numbered level transmission shaft 503, the odd-numbered level transmission gear train, the odd-numbered level reverse rotation transmission gear train, the odd-numbered level forward/reverse switching mechanical clutch 561, the second group of speed-changing gear trains, and the like.

An even-numbered level speed change mechanism is configured by the even-numbered level main clutch 512, the even-numbered level transmission shaft 504, the even-numbered level transmission gear train, the even-numbered level reverse rotation transmission gear train, the even-numbered level forward/reverse switching mechanical clutch 562, the second group of speed-changing gear trains, and the like.

<The Number of Teeth in Each Gear>

More specifically, according to the second embodiment, the number of teeth in each gear is set as follows as with the first embodiment. The number of teeth is 31 in the odd-numbered level input gear 521, 46 in the even-numbered level input gear 522, 64 in the odd-numbered level transmission gear 531 and the even-numbered level reverse rotation transmission gear 551, 74 in the even-numbered level transmission gear 532 and the odd-numbered level reverse rotation transmission gear 552, 30 in the speed-changing gear 571 and the speed-changing gear 572, 51 in the speed-changing gear 573 and the speed-changing gear 574, 65 in the speed-changing gear 575 and the speed-changing gear 576, 77 in the speed-changing gear 577 and the speed-changing gear 578, 58 in the first output gear 591, 59 in the second output gear 592, 45 in the third output gear 593, and 32 in the fourth output gear 594.

<Change Gear Ratio and Interlevel Ratio>

Therefore, if the engagement of the odd-numbered level main clutch 511 is performed by engaging the odd-numbered level forward/reverse switching mechanical clutch 561 with the odd-numbered level transmission gear 531 and engaging the first speed-changing gear mechanical clutch 581 with the speed-changing gear 571, the "first" state is achieved. The gear change ratio thereof from the perspective of the engine 510 equals to (64/31×58/30)=3.991.

If the engagement of the even-numbered level main clutch 512 is performed by engaging the even-numbered level forward/reverse switching mechanical clutch 562 with the even-numbered level transmission gear 532 and engaging the second speed-changing gear mechanical clutch 582 with the speed-changing gear 572, the "second" state is achieved. The gear change ratio thereof from the perspective of the engine 510 equals to (74/46×58/30)=3.110. The interlevel ratio between the first and the second is "1.283."

If the engagement of the odd-numbered level main clutch 511 is performed by engaging the odd-numbered level forward/reverse switching mechanical clutch 561 with the odd-numbered level transmission gear 531 and engaging the first speed-changing gear mechanical clutch 581 with the speed-changing gear 573, the "third" state is achieved. The gear change ratio thereof from the perspective of the engine 510 equals to (64/31×59/51)=2.388. The interlevel ratio between the second and the third is "1.302."

If the engagement of the even-numbered level main clutch 512 is performed by engaging the even-numbered level forward/reverse switching mechanical clutch 562 with the even-numbered level transmission gear 532 and engaging the second speed-changing gear mechanical clutch 582 with the speed-changing gear 574, the "fourth" state is achieved. The gear change ratio thereof from the perspective of the engine 510 equals to (74/46×59/51)=1.861. The interlevel ratio between the third and the fourth is "1.283."

If the engagement of the odd-numbered level main clutch 511 is performed by engaging the odd-numbered level forward/reverse switching mechanical clutch 561 with the odd-numbered level transmission gear 531 and engaging the third speed-changing gear mechanical clutch 583 with the speed-changing gear 575, the "fifth" state is achieved. The gear change ratio thereof from the perspective of the engine 510 equals to (64/31×45/65)=1.429. The interlevel ratio between the fourth and the fifth is "1.302."

If the engagement of the even-numbered level main clutch 512 is performed by engaging the even-numbered level forward/reverse switching mechanical clutch 562 with the even-numbered level transmission gear 532 and engaging the fourth speed-changing gear mechanical clutch 584 with the speed-changing gear 576, the "sixth" state is achieved. The gear change ratio thereof from the perspective of the engine 510 equals to (74/46×45/65)=1.114. The interlevel ratio between the fifth and the sixth is "1.283."

If the engagement of the odd-numbered level main clutch 511 is performed by engaging the odd-numbered level forward/reverse switching mechanical clutch 561 with the odd-numbered level transmission gear 531 and engaging the third speed-changing gear mechanical clutch 583 with the speed-changing gear 577, the "seventh" state is achieved. The gear change ratio thereof from the perspective of the engine 510 equals to (64/31×32/77)=0.858. The interlevel ratio between the sixth and the seventh is "1.298."

If the engagement of the even-numbered level main clutch 512 is performed by engaging the even-numbered level forward/reverse switching mechanical clutch 562 with the even-numbered level transmission gear 532 and engaging the fourth speed-changing gear mechanical clutch 584 with the speed-changing gear 578, the "eighth" state is achieved. The gear change ratio thereof from the perspective of the engine 510 equals to (74/46×32/77)=0.669. The interlevel ratio between the seventh and the eighth is "1.283."

In sum, interlevel ratios fall within a range from 1.283 to 1.302, and they are designed in the present embodiment to have about equal ratios of approximately "1.29."

In a state where the odd-numbered level and even-numbered level forward/reverse switching mechanical clutches 561 and 562 are being engaged with the odd-numbered level and even-numbered level transmission gears 531 and 532 for the forward movement as described above, the first group of speed change levels are operated as the odd-numbered speed change levels and the second group of speed change levels are operated as the even-numbered speed change levels.

Conversely, in a state where the odd-numbered level and even-numbered level forward/reverse switching mechanical clutches 561 and 562 are being engaged with the odd-numbered level and even-numbered level reverse rotation transmission gears 551 and 552 for the backward movement, the roles are reversed. The first group of speed change levels are operated as the even-numbered speed change levels and the second group of speed change levels are operated as the odd-numbered speed change levels.

In other words, during the forward movement, the combination of the odd-numbered level transmission gear 531 and the speed-changing gear 571 corresponds to the "first" state; the combination of the even-numbered level transmission gear 532 and the speed-changing gear 572 corresponds to the "second" state; the combination of the odd-numbered level transmission gear 531 and the speed-changing gear 573 corresponds to the "third" state; the combination of the even-numbered level transmission gear 532 and the speed-changing gear 574 corresponds to the "fourth" state; the combination of the odd-numbered level transmission gear 531 and the speed-changing gear 575 corresponds to the "fifth" state; the combination of the even-numbered level transmission gear 532 and the speed-changing gear 576 corresponds to the "sixth" state; the combination of the odd-numbered level transmission gear 531 and the speed-changing gear 577 corresponds to the "seventh" state; and the combination of the even-numbered level transmission gear 532 and the speed-changing gear 578 corresponds to the "eighth" state.

During the backward movement, the combination of the even-numbered level reverse rotation transmission gear 551 and the speed-changing gear 572 corresponds to the "first" state; the combination of the odd-numbered level reverse rotation transmission gear 552 and the speed-changing gear 571 corresponds to the "second" state; the combination of the even-numbered level reverse rotation transmission gear 551 and the speed-changing gear 574 corresponds to the "third" state; the combination of the odd-numbered level reverse rotation transmission gear 552 and the speed-changing gear 573 corresponds to the "fourth" state; the combination of the even-numbered level reverse rotation transmission gear 551 and the speed-changing gear 576 corresponds to the "fifth" state; the combination of the odd-numbered level reverse rotation transmission gear 552 and the speed-changing gear 575 corresponds to the "sixth" state; the combination of the even-numbered level reverse rotation transmission gear 551 and the speed-changing gear 578 corresponds to the "seventh" state; and the combination of the odd-numbered level reverse rotation transmission gear 552 and the speed-changing gear 577 corresponds to the "eighth" state.

Then, the numbers of teeth in the odd-numbered level and even-numbered level transmission gears 531 and 532 for the forward movement and the numbers of teeth in the even-numbered level and odd-numbered level reverse rotation transmission gears 551 and 552 for the backward movement are designed to be symmetrically the same, and the numbers of teeth in the speed-changing gears 571, 573, 575, and 577 in the first group of speed change levels and the numbers of teeth in the speed-changing gears 572, 574, 576, and 578 in the second group of speed change levels are designed to be symmetrically the same. Therefore, it is possible to run at exactly the same change gear ratio in both of the forward and backward movements.

Here, the switching between the forward and backward movements is performed while a vehicle is at a stop. In the present embodiment, however, in a state where the engine 510 is being rotated, each of the transmission gears 531, 532, 551, and 552 is still rotated due to a drag friction even if both of the odd-numbered level and even-numbered level main clutches 511 and 512 are set in an disengaged state. In a case where a degree of rotation due to the drag friction and a torque transmitted thereby are small, it is possible to make the forward/reverse switching mechanical clutches 561 and 562 fit into claws of the transmission gears 531, 532, 551, and 552. In a case where a degree of rotation due to the drag friction and a torque transmitted thereby become large, however, it is necessary to operate an adjustment for the rotation speed of the engine, etc. Note that a reliable method for switching between the forward and backward movements will be described later in detail with FIG. 25.

The switching between the speed-changing gears 571 to 578, on the other hand, is performed while running. Thus, with regard to the speed-changing gear mechanical clutches 581 to 584, a rotational difference with the claw of the clutch in the next level is large. Therefore, unless they are synchronized with each other forcibly, it is difficult to achieve the meshing therebetween.

<Speed Change Synchronization Mechanism>

Figure 16:
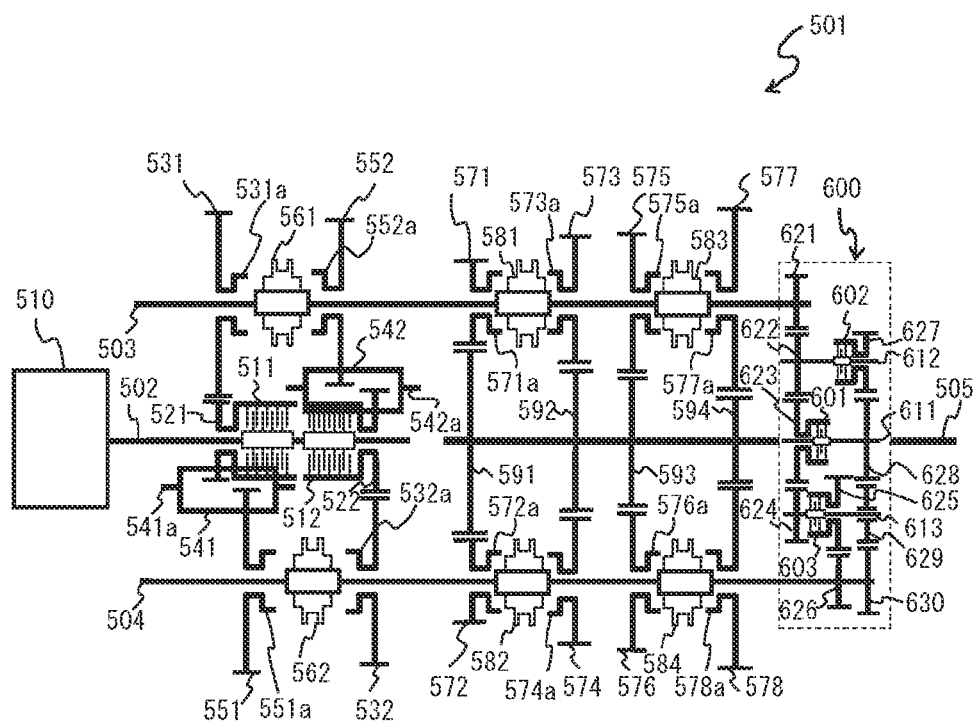
FIG. 16 is a schematic cross-sectional view showing an entire configuration of a twin clutch transmission according to a second embodiment of the present invention.

In order to achieve the synchronization of the speed-changing gears 571 to 578, a speed change synchronization mechanism 600 is provided between the odd-numbered level transmission shaft 503 and the even-numbered level transmission shaft 504 as shown in FIG. 16.

The speed change synchronization mechanism 600 includes: first to third speed change synchronizing clutches 601 to 603; first to third speed change synchronization intermediate shafts 611 to 613; and first to tenth speed change synchronizing gears 621 to 630. It is designed to forcibly maintain a rotation ratio between the odd-numbered level transmission shaft 503 and the even-numbered level transmission shaft 504 at a predetermined value when any one of the first to third speed change synchronizing clutches 601 to 603 is engaged.

In the present embodiment, a first rotation ratio, a second rotation ratio, and a third rotation ratio are set as rotation ratios of the even-numbered level transmission shaft 504 using the odd-numbered level transmission shaft 503 as a reference. The first rotation ratio is set to 1 or approximately 1; the second rotation ratio is set to be the square of an interlevel ratio between adjacent speed change levels or approximately the square thereof; and the third rotation ratio is set to be the inverse of the square of an interlevel ratio between adjacent speed change levels or approximately the inverse of the square thereof. In other words, in terms of the rotation ratio of the odd-numbered level transmission shaft 503 using the even-numbered level transmission shaft 504 as a reference, the third rotation ratio is also set to be the square of an interlevel ratio or approximately the square thereof.

The first rotation ratio is used for a speed change to the speed-changing gear sharing the same output gear and having the same number of teeth. More specifically, it is used for a shift-up from an odd-numbered level to an even-numbered level during the forward and backward movements and for a shift-down from an even-numbered level to an odd-numbered level during the forward and backward movements.

The second rotation ratio is used for a speed change to an upper level side or lower level side speed-changing gear sharing no output gear and located on an adjacent output gear side during the forward movement. More specifically, it is used for a shift-up from an even-numbered level (the second group of speed change levels) to an odd-numbered level (the first group of speed change levels) during the forward movement or a shift-down from an odd-numbered level (the first group of speed change levels) to an even-numbered level (the second group of speed change levels) during the forward movement.

The third rotation ratio is used for a speed change to an upper level side or lower level side speed-changing gear sharing no output gear and located on an adjacent output gear side during the backward movement. More specifically, it is used for a shift-up from an even-numbered level (the first group of speed change levels) to an odd-numbered level (the second group of speed change levels) during the backward movement or a shift-down from an odd-numbered level (the second group of speed change levels) to an even-numbered level (the first group of speed change levels) during the backward movement.

More specifically, the first speed change synchronizing clutch 601 is provided on the first speed change synchronization intermediate shaft 611. When the first speed change synchronizing clutch 601 is engaged, the power is transmitted from the odd-numbered level transmission shaft 503 to the first speed change synchronization intermediate shaft 611 through the speed change synchronizing gear 621→the speed change synchronizing gear 622→the speed change synchronizing gear 623. The power is further transmitted from the first speed change synchronization intermediate shaft 611 to the even-numbered level transmission shaft 504 through the speed change synchronizing gear 628→the speed change synchronizing gear 629→the speed change synchronizing gear 630 (see a thin broken line in FIG. 19). Alternatively, the power is reversely transmitted from the even-numbered level transmission shaft 504 to the odd-numbered level transmission shaft 503. The number of teeth in each of the speed change synchronizing gears 621 to 630 is designed so that the rotation ratio between the odd-numbered level transmission shaft 503 and the even-numbered level transmission shaft 504 then equals to the first rotation ratio.

The second speed change synchronizing clutch 602 is provided on the second speed change synchronization intermediate shaft 612. When the second speed change synchronizing clutch 602 is engaged, the power is transmitted from the odd-numbered level transmission shaft 503 to the second speed change synchronization intermediate shaft 612 through the speed change synchronizing gear 621→the speed change synchronizing gear 622. The power is further transmitted from the second speed change synchronization intermediate shaft 612 to the even-numbered level transmission shaft 504 through the speed change synchronizing gear 627→the speed change synchronizing gear 628→the speed change synchronizing gear 629→the speed change synchronizing gear 630. Alternatively, the power is reversely transmitted from the even-numbered level transmission shaft 504 to the odd-numbered level transmission shaft 503 (see a thin broken line in FIG. 21). The number of teeth in each of the speed change synchronizing gears 621 to 630 is designed so that the rotation ratio between the odd-numbered level transmission shaft 503 and the even-numbered level transmission shaft 504 then equals to the second rotation ratio.

The third speed change synchronizing clutch 603 is provided on the third speed change synchronization intermediate shaft 613. When the third speed change synchronizing clutch 603 is engaged, the power is transmitted from the odd-numbered level transmission shaft 503 to the third speed change synchronization intermediate shaft 613 through the speed change synchronizing gear 621→the speed change synchronizing gear 622→the speed change synchronizing gear 623→the speed change synchronizing gear 624. The power is further transmitted from the third speed change synchronization intermediate shaft 613 to the even-numbered level transmission shaft 504 through the speed change synchronizing gear 625→the speed change synchronizing gear 626. Alternatively, the power is reversely transmitted from the even-numbered level transmission shaft 504 to the odd-numbered level transmission shaft 503 (see a thin broken line in FIG. 23). The number of teeth in each of the speed change synchronizing gears 621 to 630 is designed so that the rotation ratio between the odd-numbered level transmission shaft 503 and the even-numbered level transmission shaft 504 then equals to the third rotation ratio.

Such a design allows the idling or stopped odd-numbered level transmission shaft 503 or even-numbered level transmission shaft 504 to be decelerated or accelerated to a synchronous rotation speed. Note that each of the first to third speed change synchronizing clutches 601 to 603 is preferably configured by a multiplate wet clutch.

Figure 25:
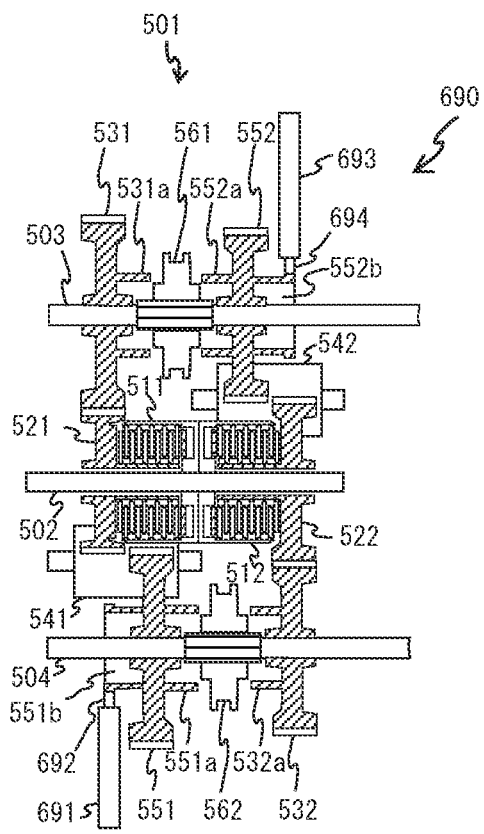
FIG. 25 is a schematic cross-sectional view showing a variation of the synchronization mechanism for switching between the forward and backward movements of the twin clutch transmission.

Note that the transmission 501 may include a forward/backward movement switching synchronization mechanism 690 utilizing a braking force as shown in FIG. 25. The forward/backward movement switching synchronization mechanism 690 is configured to include: a braking device 691 for the odd-numbered level transmission gear 531 and the even-numbered level reverse rotation transmission gear 551; a brake shoe 692 of the braking device 691; a braking device 693 for the even-numbered level transmission gear 532 and the odd-numbered level reverse rotation transmission gear 552; a brake shoe 694 of the braking device 693; and brake drums 551*b* and 552*b*.

A braking force is generated for the odd-numbered level transmission gear 531 and the even-numbered level reverse rotation transmission gear 551 by pressing the brake shoe 692 against the brake drum 551*b* integrally provided with the even-numbered level reverse rotation transmission gear 551.

Similarly, a braking force is generated for the even-numbered level transmission gear 532 and the odd-numbered level reverse rotation transmission gear 552 by pressing the brake shoe 694 against the brake drum 552*b* integrally provided with the odd-numbered level reverse rotation transmission gear 552.

In such a configuration, an appropriate amount of braking force is generated upon switching between the forward movement and the backward movement. As a result, the transmission gears 531, 532, 551, and 552 rotated by the drag friction of the odd-numbered level and even-numbered level main clutches 511 and 512 in an disengaged state are stopped, and the odd-numbered level and even-numbered level forward/reverse switching mechanical clutches 561 and 562 in a stopped state are coupled so as to perform a switching between the forward rotation and the reverse rotation.

<Control System>

Figure 17:
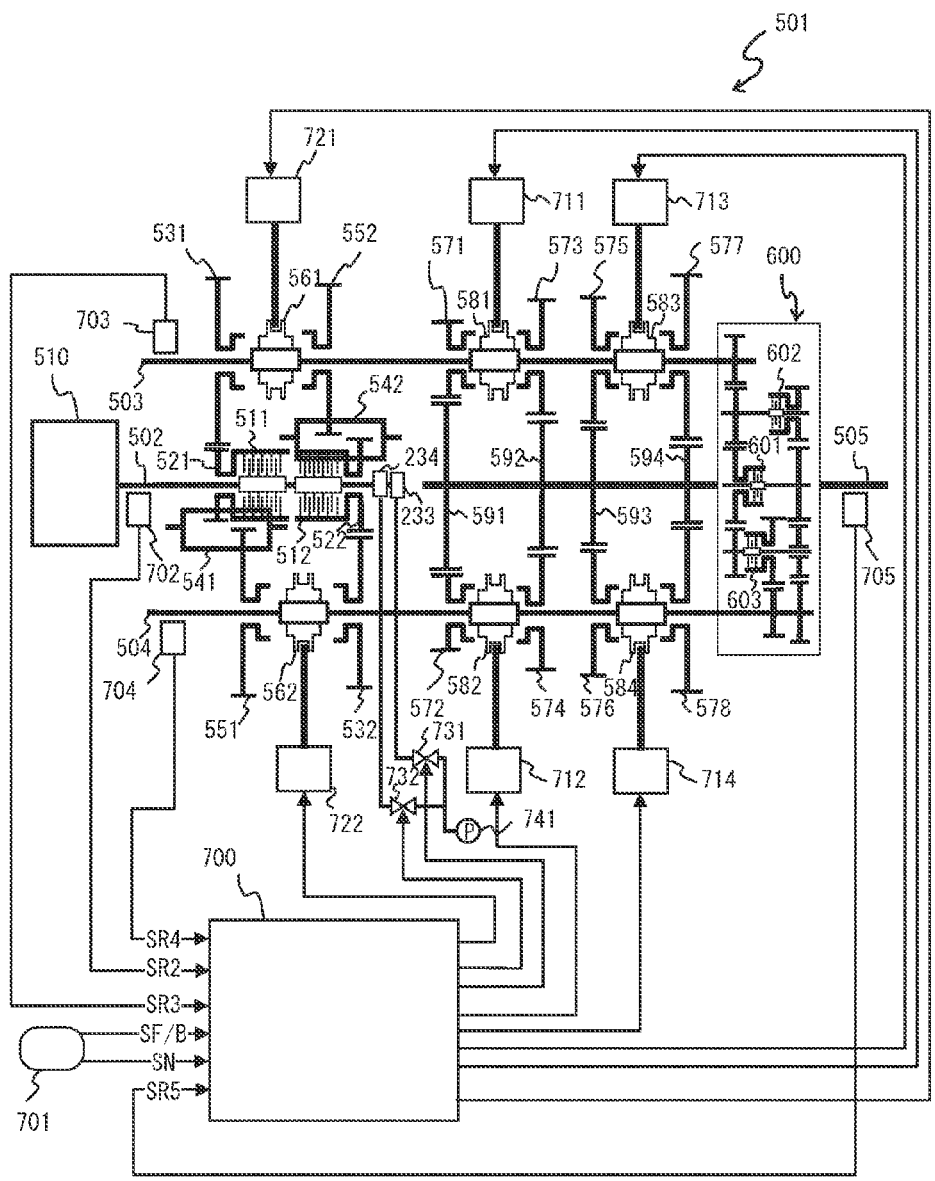
FIG. 17 is a schematic diagram showing a configuration of a control system for the twin clutch transmission.

FIG. 17 shows a control system for the transmission 501. The control system is configured to have a controller 700. In addition to information inputted from a master controller 701 in a cab of a diesel railcar (a forward/backward movement command signal SF/B and a notch command signal SN), information detected by rotation sensors 702 to 705 provided respectively in the input shaft 502, the odd-numbered level transmission shaft 503, the even-numbered level transmission shaft 504, and the output shaft 505 (rotation speed signals SR2 to SR5 of the shafts 502 to 505) is inputted to the controller 700.

Then, based on the above-described inputted information, the controller 700 controls speed-changing gear switching shift actuators 711 to 714, forward or backward movement switching shift actuators 721 and 722, and linear solenoid valves 731 and 732 by outputting a control current (control signals).

The speed-changing gear switching shift actuators 711 to 714 are drive means for sliding the speed-changing gear mechanical clutches 581 to 584. The first speed-changing gear switching shift actuator 711 allows the first speed-changing gear mechanical clutch 581 to be slid on the odd-numbered level transmission shaft 503 in the axial direction thereof; the second speed-changing gear switching shift actuator 712 allows the second speed-changing gear mechanical clutch 582 to be slid on the even-numbered level transmission shaft 504 in the axial direction thereof; the third speed-changing gear switching shift actuator 713 allows the third speed-changing gear mechanical clutch 583 to be slid on the odd-numbered level transmission shaft 503 in the axial direction thereof; and the fourth speed-changing gear switching shift actuator 714 allows the fourth speed-changing gear mechanical clutch 584 to be slid on the even-numbered level transmission shaft 504 in the axial direction thereof.

The forward/backward movement switching shift actuators 721 and 722 are drive means for sliding the odd-numbered level and even-numbered level forward/reverse switching mechanical clutches 561 and 562. The first forward/backward movement switching shift actuator 721 allows the odd-numbered level forward/reverse switching mechanical clutch 561 to be slid on the odd-numbered level transmission shaft 503 in the axial direction thereof, and the second forward/backward movement switching shift actuator 722 allows the even-numbered level forward/reverse switching mechanical clutch 562 to be slid on the even-numbered level transmission shaft 504 in the axial direction thereof.

The linear solenoid valves 731 and 732 are valves for adjusting a flow rate of pressure oil generated by a hydraulic pump 741 in order to engage the main clutches 511 and 512. The linear solenoid valves 731 and 732 are designed to be communicated with an oil passage formed inside the input shaft 502 by means of rotating hydraulic connectors 733 and 734 so as to supply the pressure oil to respective pistons of the main clutches 511 and 512. The main clutches 511 and 512 are engaged by the supply of the pressure oil to the pistons.

Figure 18:
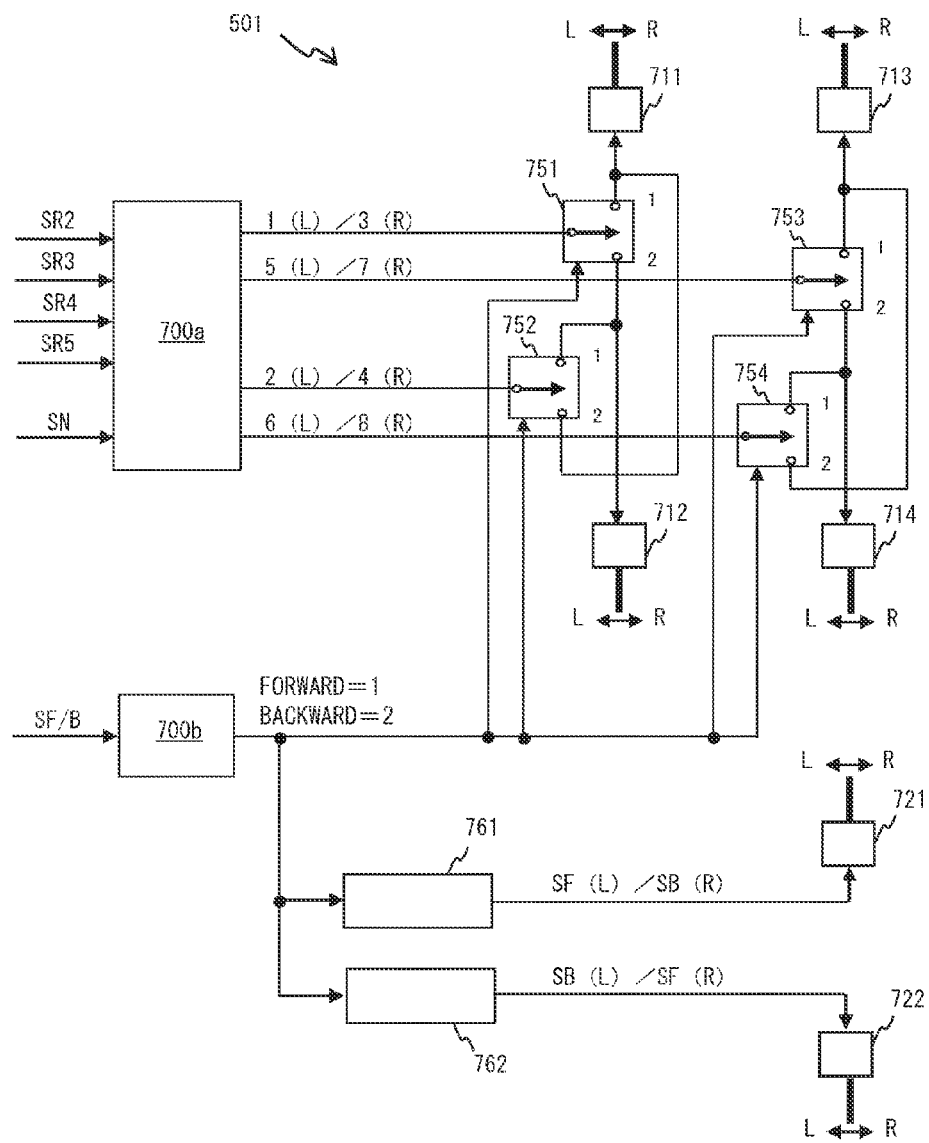
FIG. 18 is a schematic diagram showing a method for controlling the control system for the twin clutch transmission.

Control for the shift actuators 711 to 714, 721, and 722 of the controller 700 will be described in detail with reference to FIG. 18. More specifically, the controller 700 includes a speed-changing clutch controller 700*a* and a forward/backward movement determination section 700*b*. The signals of the respective rotation sensors 702 to 705 (the rotation speed signals SR2 to SR5) and the notch command signal SN are inputted to the speed-changing clutch controller 700*a*, and the forward/backward movement command signal SF/B is inputted to the forward/backward movement determination section 700*b*.

The speed-changing clutch controller 700*a* performs a switching of the speed-changing gears 571 to 578 to be engaged on the basis of the rotation speed signals SR2 to SR5 and the notch command signal SN. With respect to the first gear, for example, for the forward movement, the first speed-changing gear switching shift actuator 711 is driven to the left, thereby engaging the first speed-changing mechanical clutch 581 with the speed-changing gear 571. For the backward movement thereof, the second speed-changing gear switching shift actuator 712 is driven to the left, thereby engaging the second speed-changing mechanical clutch 582 with the speed-changing gear 572.

Then, the forward/backward movement determination section 700b is configured to control the positions of selector switches 751 to 754 on the basis of the forward/backward movement command signal SF/B so that the selector switches are set to the side of "1" during the forward movement and set to the side of "2" during the backward movement. Thus, the control can be always made with the same output from the perspective of the speed-changing clutch controller 700a. The other speed-changing shift actuators are also connected in a similar manner. Although the selector switches 751 to 754 may be configured by a hardware such as a relay, they may be configured by a logic which is a software.

For the switching of the odd-numbered level and even-numbered level forward/reverse switching mechanical clutches 561 and 562, an output of the forward/backward movement determination section 700b is translated into a left-right signal as it is at a first signal converting section 761 or translated into a left-right reversal signal at a second signal converting section 762 to be outputted to the forward/backward movement switching shift actuator 721 or 722.

<Shift-Up from Odd-Numbered Level to Even-Numbered Level>

According to the thus configured transmission 1, a shift-up from an even-numbered level to an odd-numbered level, i.e., from the first to the second, from the third to the fourth, from the fifth to the sixth, or from the seventh to the eighth, is achieved by switching a power-transmitting pathway from the odd-numbered level transmission shaft 503 to the even-numbered level transmission shaft 504 during the forward movement and by switching the power-transmitting pathway from the even-numbered level transmission shaft 504 to the odd-numbered level transmission shaft 503 during the backward movement.

Figure 19:
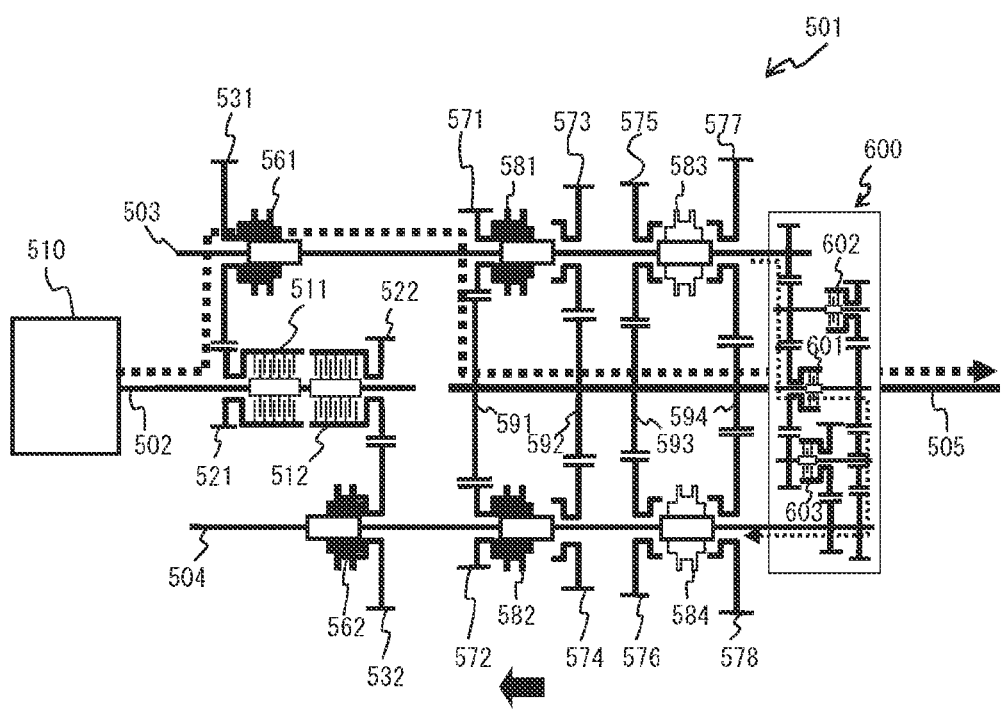
FIG. 19 is a schematic diagram showing a preparation state when changing a speed from the first to the second during the forward movement in the twin clutch transmission.

How a shift-up from the first to the second is performed during the forward movement will be described below with FIGS. 19 and 20. Since it is forward movement running, each of the odd-numbered level and even-numbered level forward/reverse switching mechanical clutches 561 and 562 is engaged with the odd-numbered level transmission gear 531 or the even-numbered level transmission gear 532 on the forward movement side before departure. While running in the first, the odd-numbered level main clutch 511 is engaged with the input shaft 502, and the engine torque is transmitted to the output shaft 505 through a pathway shown by a thick broken line in FIG. 19. At this time, the even-numbered level main clutch 512 is being disengaged.

In order to shift up from the first to the second, the second gear needs to be synchronously coupled before the speed change. A shift-up from an odd-numbered level to an even-numbered level is a speed change to the speed-changing gear sharing the same output gear and having the same number of teeth. Thus, it is only necessary to make the rotation speeds of the odd-numbered level transmission shaft 503 and the even-numbered level transmission shaft 504 equal to each other. As shown by the thick dashed line, when the first speed change synchronizing clutch 601 of the speed change synchronization mechanism 600 is engaged, the odd-numbered level transmission shaft 503 and the even-numbered level transmission shaft 504 are connected to each other at 1:1, resulting in the same rotation speeds thereof. The speed-changing gear mechanical clutch 581 to 584 is easily engaged with the speed-changing gear 571 to 578 at the next level.

Figure 20:
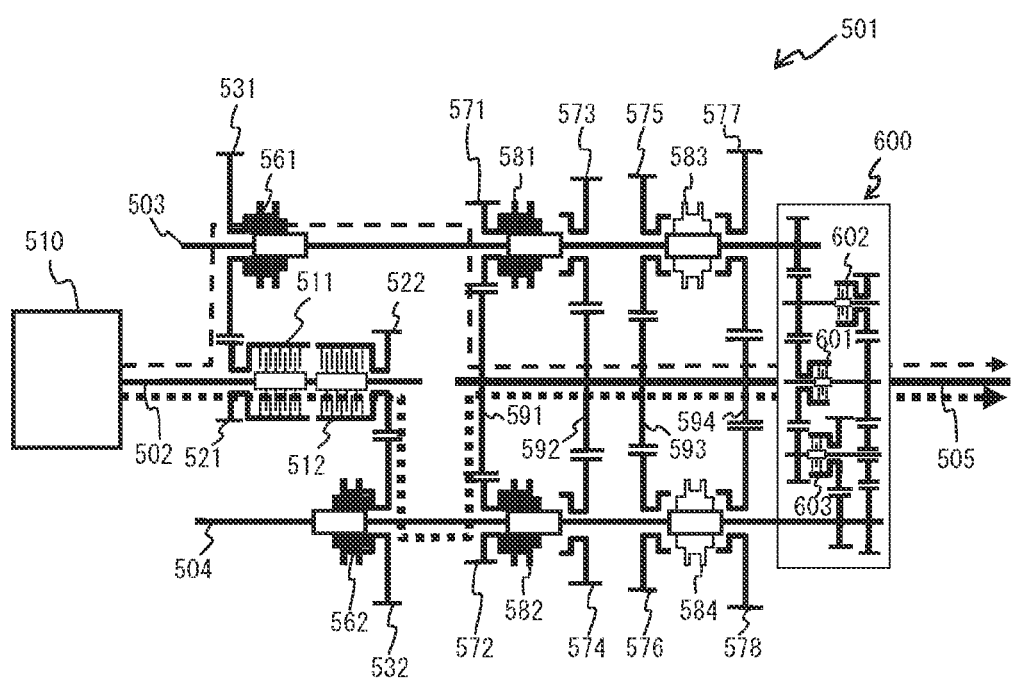
FIG. 20 is a schematic diagram showing a transition state when changing a speed from the first to the second during the forward movement in the twin clutch transmission.

Next, if the even-numbered level main clutch 512 is gradually engaged, the engine torque is transitioned to the second side as shown by a thick broken line in FIG. 20, and the torque on the first side is reduced as shown by a thin broken line. At this time, the even-numbered level main clutch 512 is transmitting the torque while being slipped, i.e., in a state of what is called a torque phase. If the odd-numbered level main clutch 511 starts to be gradually disengaged when all torques are transitioned to the second side, a transfer to a state of what is called an inertia phase is obtained. A degree of slip in the odd-numbered level main clutch 511 is increased and a degree of slip in the even-numbered level main clutch 512 is reduced, thereby reducing the rotation speed of the engine. When the degree of slip in the even-numbered level main clutch 512 equals to zero, the shift-up from the first to the second is completed.

<Shift-Up from Even-Numbered Level to Odd-Numbered Level>

A shift-up from an even-numbered level to an odd-numbered level, i.e., from the second to the third, from the fourth to the fifth, or from the sixth to the seventh, is achieved by switching the power-transmitting pathway from the even-numbered level transmission shaft 504 to the odd-numbered level transmission shaft 503 during the forward movement and by switching the power-transmitting pathway from the odd-numbered level transmission shaft 503 to the even-numbered level transmission shaft 504 during the backward movement.

How a shift-up from the second to the third is performed during the forward movement will be described below with FIGS. 21 and 22.

Figure 21:
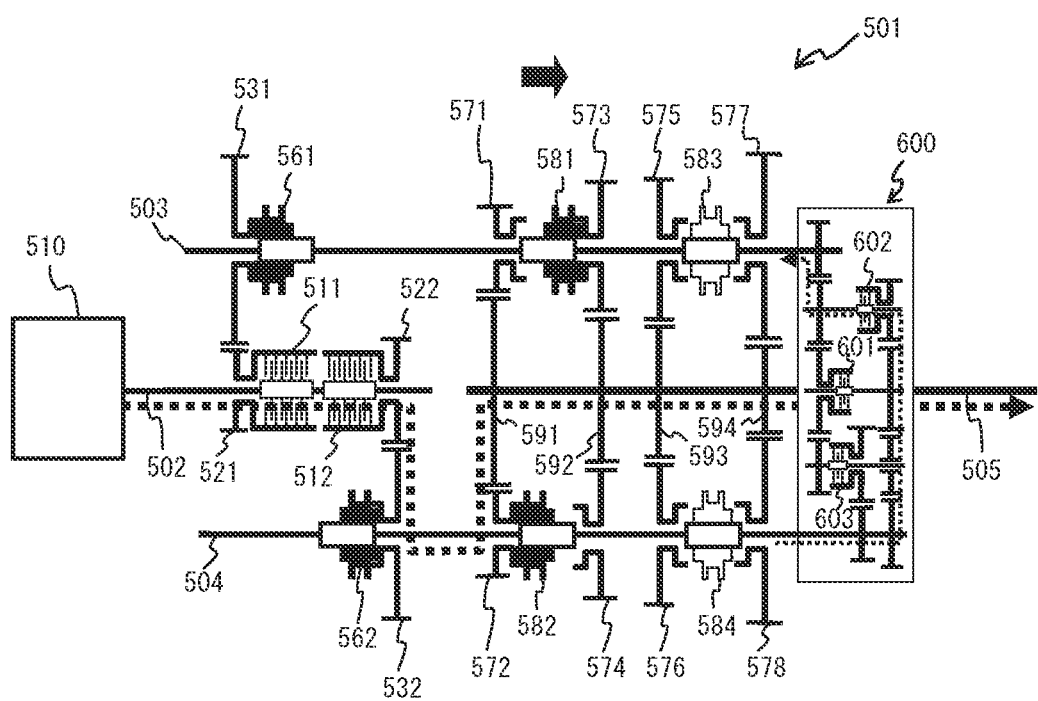
FIG. 21 is a schematic diagram showing a preparation state when changing a speed from the second to the third during the forward movement in the twin clutch transmission.

While running in the second, the even-numbered level main clutch 512 is engaged, and the engine torque is transmitted to the output shaft 505 through a pathway shown by a thick broken line in FIG. 21. At this time, the odd-numbered level main clutch 511 is being disengaged.

In order to shift up from the second to the third, the third gear needs to be synchronously coupled before the speed change. A shift-up from an even-numbered level to an odd-numbered level is a speed change to the upper-level speed-changing gear meshing with the output gear having a different number of teeth and adjacent to the output gear with which the current speed change level is meshed.

Since it is a speed change from a speed-changing gear on the even-numbered level transmission shaft 504 to a speed-changing gear on the odd-numbered level transmission shaft 503, when the rotation speed of the engine is 1000 $\text{min}^{-1}$, for example, the rotation speed of the even-numbered level transmission shaft 504 equals to $(1000 \times 46/74) = 621 \text{ min}^{-1}$ by multiplying it by the gear ratio between the even-numbered level input gear 522 and the even-numbered level transmission gear 532. Further, the rotation speed of the output shaft 505 equals to $(621 \times 30/58) = 321 \text{ min}^{-1}$ by multiplying it by the gear ratio between the speed-changing gear 572 and the first output gear 591. Also, the rotation speed of the third gear equals to $(321 \times 59/51) = 371 \text{ min}^{-1}$ by multiplying it by the gear ratio between the second output gear 592 and the speed-changing gear 573.

This equals to a value obtained by dividing 621 $\text{min}^{-1}$, which is the rotation speed of the even-numbered level transmission shaft 504, by the square of the interlevel ratio. More specifically, the interlevel ratio between the first and the second is 1.283 and the interlevel ratio between the second and the third is 1.302. Regarding the interlevel ratio as 1.293 on average, the square of the interlevel ratio equals to 1.67, and the rotation speed of the third gear therefore equals to $(621/1.67) = 372 \text{ min}^{-1}$.

Thus, for the shift-up from the second to the third during the forward movement, it is only necessary to forcibly change the rotation speed of the odd-numbered level transmission shaft 503 to the value obtained by dividing the rotation speed of the even-numbered level transmission shaft 504 by the square of the interlevel ratio or a value in the vicinity thereof.

As described above, the gear train of the speed change synchronization mechanism 600 at the time of the engagement of the second speed change synchronizing clutch 602 is designed so that the odd-numbered level transmission shaft 503 and the even-numbered level transmission shaft 504 can be connected to each other at the square of the interlevel ratio. Thus, as shown by a dot line in FIG. 21, if the second speed change synchronizing clutch 602 is engaged, the speed-changing gear mechanical clutch 581 is easily fitted with the claw 573a of the speed-changing gear 573.

Figure 22:
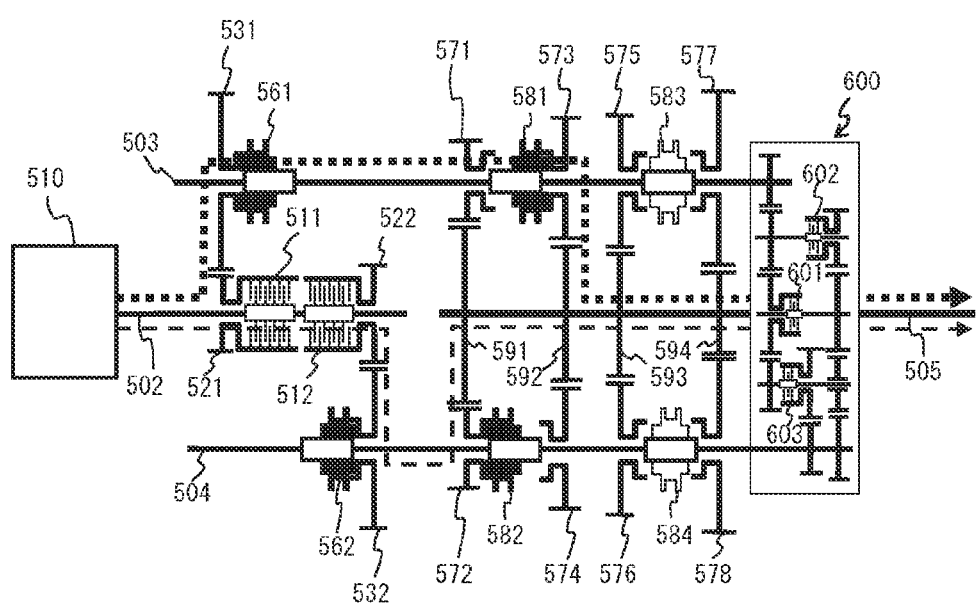
FIG. 22 is a schematic diagram showing a transition state when changing a speed from the second to the third during the forward movement in the twin clutch transmission.

Next, if the odd-numbered level main clutch 511 is gradually engaged, the engine torque is transitioned to the third side as shown by a thick broken line in FIG. 22, and the torque on the second side is reduced as shown by a thin broken line. At this time, the odd-numbered level main clutch 511 is in a state of the torque phase in which it transmits the torque while being slipped. If the even-numbered level main clutch 512 starts to be gradually disengaged when all the torques are transitioned to the third side, a transfer to a state of the inertia phase is obtained. A degree of slip in the even-numbered level main clutch 512 is increased and a degree of slip in the odd-numbered level main clutch 511 is reduced, thereby reducing the rotation speed of the engine. When the degree of slip in the odd-numbered level main clutch 511 equals to zero, the shift-up from the second to the third is completed.

During the backward movement, the roles of the odd-numbered level transmission shaft 503 and the even-numbered level transmission shaft 504 are reversed. Thus, when shifting up from an even-numbered level to an odd-numbered level, it is necessary to change the rotation speed of the even-numbered level transmission shaft 504 to a value obtained by dividing the rotation speed of the odd-numbered level transmission shaft 503 by the square of the interlevel ratio or a value in the vicinity thereof. For this purpose, the gear train of the speed change synchronization mechanism 600 is set so that the even-numbered level transmission shaft 504 and the odd-numbered level transmission shaft 503 are connected to each other at the square of the interlevel ratio when the third speed change synchronizing clutch 603 is engaged.

<Shift-Down>

Also in a case of a shift-down, the lower-level speed-changing gear is synchronously coupled before the speed change by the speed change synchronization mechanism 600 as with the case of a shift-up.

For a shift-down from an even-numbered level to an odd-numbered level, the first speed change synchronizing clutch 601 is engaged so as to make the rotation speeds of the odd-numbered level transmission shaft 503 and the even-numbered level transmission shaft 504 equal to each other. As a result, the lower-level speed-changing gear is synchronously coupled quickly.

For a shift-down from an odd-numbered level to an even-numbered level, on the other hand, the second speed change synchronizing clutch 602 is engaged during the forward movement so that the rotation speed of the even-numbered level transmission shaft 504 is set to a value obtained by multiplying the rotation speed of the odd-numbered level transmission shaft 503 by the square of the interlevel ratio. The third speed change synchronizing clutch 603 is engaged during the backward movement so that the rotation speed of the odd-numbered level transmission shaft 503 is set to a value obtained by multiplying the rotation speed of the even-numbered level transmission shaft 504 by the square of the interlevel ratio. As a result, the lower-level speed-changing gear is synchronously coupled quickly.

Figure 23:
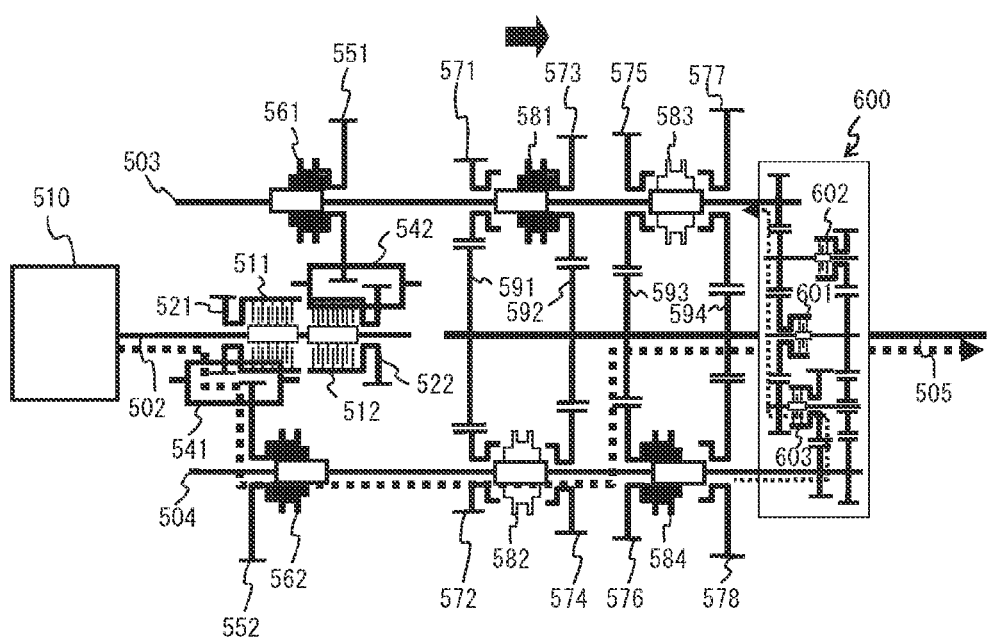
FIG. 23 is a schematic diagram showing a preparation state when changing a speed from the fifth to the fourth during the backward movement in the twin clutch transmission.
Figure 24:
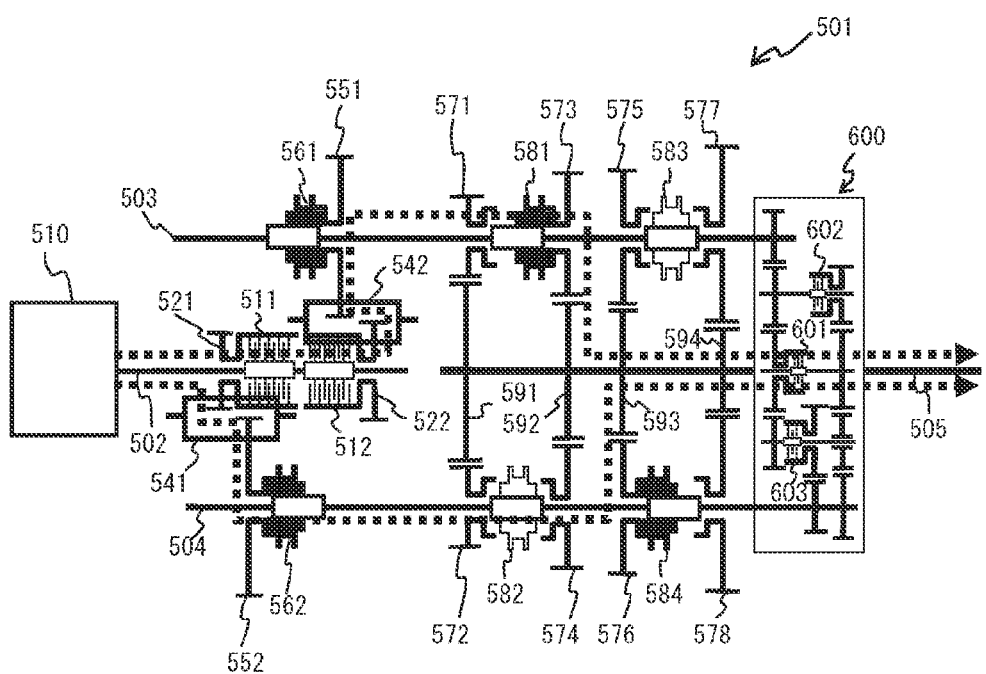
FIG. 24 is a schematic diagram showing a transition state when changing a speed from the fifth to the fourth during the backward movement in the twin clutch transmission.

How a shift-down from the fifth to the fourth is performed during the backward movement will be described below with FIGS. 23 and 24. The odd-numbered levels and the even-numbered levels are reversed between the forward and backward movements in the transmission 501. Thus, the second group of speed change levels of the even-numbered level transmission shaft 504 correspond to the odd-numbered levels during the backward movement.

While running in the fifth, the speed-changing gear 576 is coupled and the odd-numbered level main clutch 511 is thus engaged. The engine torque is transmitted to the output shaft 505 through a pathway shown by a thick broken line in FIG. 23. At this time, the even-numbered level main clutch 512 is being disengaged. In order to shift down to the fourth, the fourth gear, i.e., the speed-changing gear 573 needs to be synchronously coupled before the speed change. A shift-down from an odd-numbered level to an even-numbered level is a transfer to the speed-changing gear meshing with the adjacent output gear. Therefore, it is only necessary to set the rotation speed of the odd-numbered level transmission shaft 503 to a value obtained by multiplying the rotation speed of the even-numbered level transmission shaft 504 by the square of the interlevel ratio. Thus, as shown by a dot line in FIG. 23, if the third synchronizing clutch is engaged, the speed-changing gear mechanical clutch 581 can be easily engaged with the speed-changing gear 573.

Since it is a shift-down, a transition of the engine torque by the torque phase is impossible to occur in principle. Thus, if the odd-numbered level main clutch 511 is gradually disengaged, the odd-numbered level main clutch 511 starts to be slipped with the engine torque being transmitted to the fifth side as shown by a thick broken line in FIG. 24, resulting in a transfer to a state of the inertia phase. When the slip rotation speed reaches its maximum, the rotational difference of the even-numbered level main clutch 512 becomes zero. Thus, if the even-numbered level main clutch 512 is engaged simultaneously with the disengaging of the odd-numbered level main clutch 511, the engine torque transitions to the fourth gear (the speed-changing gear 573) from the fifth gear (the speed-changing gear 576) at once, thereby completing the shift-down.

According to the twin clutch transmission 501 of the above-described second embodiment, since the odd-numbered level and even-numbered level forward/reverse switching mechanical clutches 561 and 562 can be placed on the input side having a smaller torque, compact and inexpensive clutches can be mounted. Furthermore, they can be placed in parallel to the main clutches 511 and 512, thereby reducing the shaft length of the transmission 501. Moreover, the output shaft 505 can be placed on a line as an extension of the shaft of the engine 510. Thus, it is possible to realize the transmission 501 of a compact size.

Especially, the gear on the input shaft in the odd-numbered level reverse rotation transmission gear train is shared by the even-numbered level input gear 522, and, at the same time, the gear on the input shaft in the even-numbered level reverse rotation transmission gear train is shared by the odd-numbered level input gear 521. As a result, the number of gears required for a switching between the forward rotation and the reverse rotation is reduced. Thus, the compact transmission 501 having a size reduced thereby can be obtained. At the same time, this leads to the even-numbered level main clutch 512 also playing the role of the odd-numbered level reverse rotation main clutch for transmitting the engine torque to the odd-numbered level reverse rotation transmission gear train. Similarly, this lead to the odd-numbered level main clutch 511 also playing the role of the even-numbered level reverse rotation main clutch for transmitting the engine torque to the even-numbered level reverse rotation transmission gear train. As a result, the number of friction clutches is reduced, thereby achieving the transmission 501 of a more compact size.

Moreover, since the main clutches 511 and 512 and the odd-numbered level and even-numbered level forward/reverse switching mechanical clutches 561 and 562 are placed symmetrically, a difference in the number of gear meshes between the forward movement and the backward movement can be set to one at a maximum. Thus, there is obtained an advantage of eliminating imbalance in the transmission efficiencies thereof. This well-balanced gear configuration is particularly useful in a diesel railcar for which operating times for forward and backward and backward movements are approximately the same.

Moreover, since the interlevel ratios from the first to the eighth are designed to be approximately constant, the speed change synchronization mechanism 600 can be summarized into a small number of synchronizing gear ratios. Thus, a quick preliminary engagement of the next level gear becomes possible with the speed change synchronization mechanism 600 of a compact size, thereby obtaining advantages of speeding up the speed-changing operation and improving a ride quality.

In other words, even in the configuration such that the even-numbered levels and the odd-numbered levels are switched over between the forward movement and the backward movement, a shift-up or a shift-down can be performed while mechanically achieving synchronization by: preparing the synchronizing gear train achieving the first rotation ratio for the synchronization for a shift-up and a shift-down between levels sharing an output gear; preparing the synchronizing gear train achieving the second rotation ratio for the synchronization for a shift-up and a shift-down between levels sharing no output gear during the forward movement; and preparing the synchronizing gear train achieving the third rotation ratio for the synchronization for a shift-up and a shift-down between levels sharing no output gear during the backward movement.

Moreover, since the forward/backward movement switching synchronization mechanism 690 is provided on the input side so as to be parallel to the input shaft 502, there is no need to extend the shaft length of the transmission 501 for the forward/backward movement switching synchronization mechanism 690. Thus, it is possible to achieve the compact transmission 501 in this aspect, too.

Figure 26:
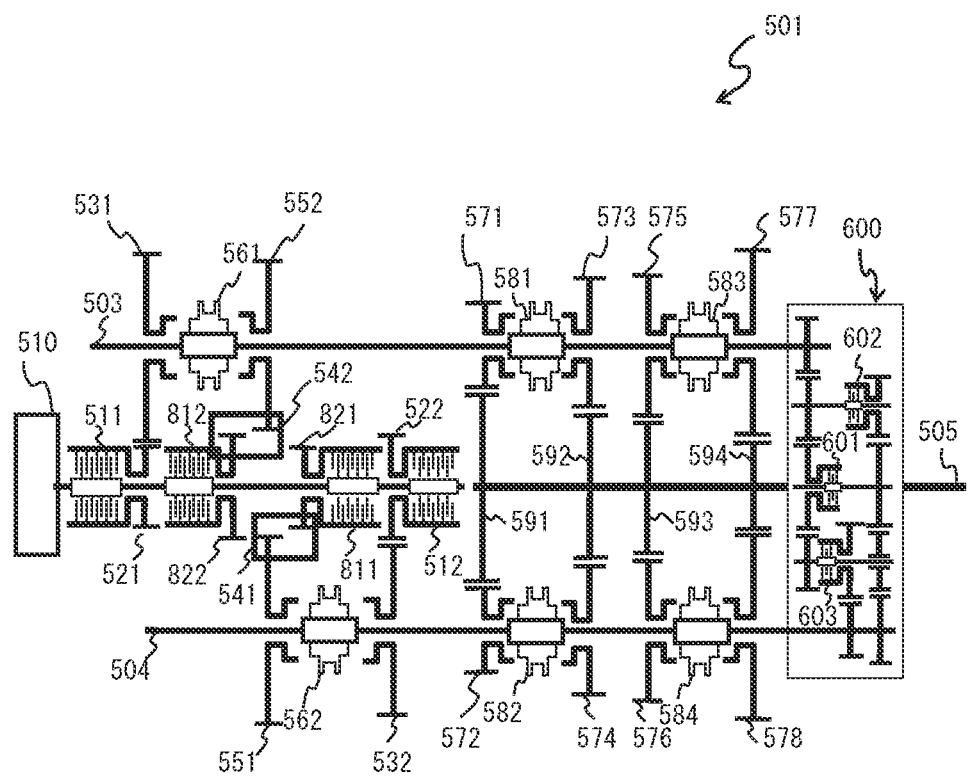
FIG. 26 is a schematic cross-sectional view showing a variation of the twin clutch transmission.

Although a size in the axial direction is enlarged in some degree, an odd-numbered level reverse rotation input gear 822 dedicated for the odd-numbered level reverse rotation and an even-numbered level reverse rotation input gear 821 dedicated for the even-numbered level reverse rotation may be provided on the input shaft 502 as in another configuration example shown in FIG. 26. In this case, an odd-numbered level reverse rotation main clutch 812 for coupling the input shaft 502 with the odd-numbered level reverse rotation input gear 822 may be provided aside from the odd-numbered level main clutch 511. Further, an even-numbered level reverse rotation main clutch 811 for coupling the input shaft 502 with the even-numbered level reverse rotation input gear 821 may be provided aside from the even-numbered level main clutch 512. In this case, in a case where a forward rotational operation is performed by utilizing the odd-numbered level main clutch 511 and the even-numbered level main clutch 512, for example, it is preferred to separate off the even-numbered level reverse rotation main clutch 811 and the odd-numbered level reverse rotation main clutch 812 not in use by the odd-numbered level forward/reverse switching mechanical clutch 561 and the even-numbered level forward/reverse switching mechanical clutch 562 so as to reduce the drag loss of these main clutches.

On the other hand, in comparison with the configuration of FIG. 26, in the configuration shown in FIG. 16, the input shaft side gear (the even-numbered level input gear 522) of the even-numbered level transmission gear train is used as a substitute for the input shaft side gear to be meshed with the odd-numbered level reverse rotation transmission gear 552, and the input shaft side gear (the odd-numbered level input gear 521) of the odd-numbered level transmission gear train is used as a substitute for the input shaft side gear of the even-numbered level reverse rotation transmission gear 551. Moreover, the even-numbered level main clutch 512 is used as a substitute for the odd-numbered level reverse rotation main clutch, and the odd-numbered level main clutch 511 is used as a substitute for the even-numbered level reverse rotation main clutch. It can be seen that an extremely downsized twin clutch transmission can be obtained by sharing the respective main clutches and input gears in the forward rotational operation and the reverse rotational operation and also by switching over the speed-changing gear trains on the odd-numbered level side and those on the even-numbered level side between the forward rotational operation and the reverse rotational operation as described above.

According to the embodiments shown in these, it is configured so that each speed-changing gear train includes speed-changing gears of four speeds to achieve speed changes of eight levels. However, the number of speed-changing gears is not limited thereto. Moreover, the sequence of the speed-changing gears is not limited to the configuration increasing from a lower-speed to a higher-speed in the order starting from the engine side.

Moreover, although a case where this transmission is applied to a diesel railcar such as a rail vehicle has been described in the above-described embodiments, for example, the application thereof is not limited to a diesel railcar as long as it is a drive system employing a similar twin clutch transmission. It is possible to apply the transmission to other vehicles such as a normal automobile, a commercial vehicle (a truck or a bus, for example), or an industrial vehicle (a hydraulic shovel or a forklift, for example). In a case of an application to a normal automobile, for example, it is preferable that a first gear for the backward movement be added to the speed-changing gears and the number of speed-changing gears and the sequence thereof be configured to be suitable for that vehicle (in the case of six speeds+backward movement, for example, the gears are disposed on the odd-numbered level transmission shaft in the order of the first→the backward movement→the third→the fifth and the gears are disposed on the even-numbered level transmission shaft in the order of the second→the fourth→the sixth). It may be applied also to a vehicle using a gasoline engine as the engine thereof.

The transmission of the present invention is not limited to the above-described embodiments, and it is to be understood that various changes can be made without departing from the scope of the present invention.

INDUSTRIAL APPLICABILITY

In addition to an application to a diesel railcar, the twin clutch transmission of the present invention is suitable for use in various applications, chiefly in applications to large horsepower vehicles.

REFERENCE SIGNS LIST 1 transmission
2 diesel engine
10 input shaft
30 odd-numbered level speed change mechanism
32 odd-numbered level transmission gear train
34 odd-numbered level main clutch
40 odd-numbered level transmission shaft
41 first speed-changing gear train
43 third speed-changing gear train
45 fifth speed-changing gear train
47 seventh speed-changing gear train
50, 52 odd-numbered level mechanical clutch
60 even-numbered level speed change mechanism
62 even-numbered level transmission gear train
64 even-numbered level main clutch
70 even-numbered level transmission shaft
72 second speed-changing gear train
74 fourth speed-changing gear train
76 sixth speed-changing gear train
78 eighth speed-changing gear train
90 output mechanism
94 output shaft
100 synchronizing speed change mechanism
110 first synchronizing gear train
112 first synchronizing clutch
120 second synchronizing gear train
122 second synchronizing clutch
501 transmission
502 input shaft
503 odd-numbered level transmission shaft
504 even-numbered level transmission shaft
510 engine
511 odd-numbered level main clutch
512 even-numbered level main clutch
521 odd-numbered level input gear
522 even-numbered level input gear
531 odd-numbered level transmission gear
532 even-numbered level transmission gear
542 odd-numbered level reverse rotation idler gear
542a odd-numbered level reverse rotation idler shaft
541 even-numbered level reverse rotation idler gear
541a even-numbered level reverse rotation idler shaft
551 even-numbered level reverse rotation transmission gear
552 odd-numbered level reverse rotation transmission gear
561 odd-numbered level forward/reverse switching mechanical clutch
562 even-numbered level forward/reverse switching mechanical clutch

The invention claimed is:

1. A twin clutch transmission comprising:
an input shaft to which a power of an engine is inputted;
an output shaft from which at least a rotation in a first direction is outputted;
an odd-numbered level speed change mechanism to which a rotation of the input shaft is transmitted, the odd-numbered level speed change mechanism performing a speed change of an odd-numbered level when the output shaft is rotated in the first direction;
an even-numbered level speed change mechanism to which a rotation of the input shaft is transmitted, the even-numbered level speed change mechanism performing a speed change of an even-numbered level when the output shaft is rotated in the first direction;
a synchronizing speed change mechanism for synchronizing the odd-numbered level speed change mechanism and the even-numbered level speed change mechanism at a time of a speed change; and
an output mechanism for transmitting powers of the odd-numbered level speed change mechanism and the even-numbered level speed change mechanism to the output shaft, wherein:
the odd-numbered level speed change mechanism includes
an odd-numbered level transmission shaft,
an odd-numbered level transmission gear train placed between the input shaft and the odd-numbered level transmission shaft,
an odd-numbered level main clutch for selectively transmitting a rotation of the input shaft to the odd-numbered level transmission shaft via the odd-numbered level transmission gear train,
an odd-numbered level speed-changing gear train provided on the odd-numbered level transmission shaft, the odd-numbered level speed-changing gear train transmitting the rotation to the output mechanism, and
an odd-numbered level mechanical clutch for selectively coupling the odd-numbered level speed-changing gear train with the odd-numbered level transmission shaft;
the even-numbered level speed change mechanism includes
an even-numbered level transmission shaft,
an even-numbered level transmission gear train placed between the input shaft and the even-numbered level transmission shaft,
an even-numbered level main clutch for selectively transmitting a rotation of the input shaft to the even-numbered level transmission shaft via the even-numbered level transmission gear train,
an even-numbered level speed-changing gear train provided on the even-numbered level transmission shaft, the even-numbered level speed-changing gear train transmitting the rotation to the output mechanism, and
an even-numbered level mechanical clutch for selectively coupling the even-numbered level speed-changing gear train with the even-numbered level transmission shaft; and
the synchronizing speed change mechanism includes
a synchronizing gear train for coupling a rotation of the odd-numbered level transmission shaft with that of the even-numbered level transmission shaft, and
a synchronizing clutch for selecting coupling by the synchronizing gear train.

2. The twin clutch transmission according to claim 1, wherein interlevel ratios between adjacent speed levels are set to be approximately constant.

3. The twin clutch transmission according to claim 2, wherein gear ratios of the odd-numbered level transmission gear train and the even-numbered level transmission gear train are set so that a rotation ratio of the even-numbered level transmission shaft with respect to the odd-numbered level transmission shaft becomes approximately equal to the interlevel ratio.

4. The twin clutch transmission according to claim 3, wherein gear ratios of the odd-numbered level speed-changing gear train and the even-numbered level speed-changing gear train are approximately equal to each other between at least a part of adjacent speed change levels, and a gear of the output mechanism is shared between the odd-numbered level speed-changing gear train and the even-numbered level speed-changing gear train.

5. The twin clutch transmission according to claim 1, wherein:
the synchronizing speed change mechanism includes
a first synchronizing gear train for coupling the odd-numbered level transmission shaft and the even-numbered level transmission shaft so as to achieve a first rotation ratio therebetween,
a first synchronizing clutch for selecting coupling by the first synchronizing gear train,
a second synchronizing gear train for coupling the odd-numbered level transmission shaft and the even-numbered level transmission shaft so as to achieve a second rotation ratio therebetween, and
a second synchronizing clutch for selecting coupling by the second synchronizing gear train; and
a shift-up or a shift-down is performed while achieving synchronization between the odd-numbered level speed change mechanism and the even-numbered level speed change mechanism by selectively coupling the first synchronizing gear train and the second synchronizing gear train.

6. The twin clutch transmission according to claim 5, wherein the first rotation ratio of the first synchronizing gear train is approximately 1, and the second rotation ratio of the second synchronizing gear train is approximately equal to a square of an interlevel ratio between adjacent speed levels.

7. The twin clutch transmission according to claim 1, wherein the output mechanism includes a forward/reverse switching mechanical clutch for switching between a forward rotation and a reverse rotation of the output shaft.

8. The twin clutch transmission according to claim 1, wherein a forward/reverse switching mechanical clutch for switching between a forward rotation and a reverse rotation of the output shaft is provided on the input shaft.

9. The twin clutch transmission according to claim 1, wherein:
the odd-numbered level speed change mechanism includes
an odd-numbered level reverse rotation idler shaft placed between the input shaft and the odd-numbered level transmission shaft,
an odd-numbered level reverse rotation transmission gear train placed between the input shaft, the reverse rotation idler shaft, and the odd-numbered level transmission shaft,
an odd-numbered level main clutch for coupling the input shaft and the odd-numbered level transmission gear train,
an odd-numbered level reverse rotation main clutch for coupling the input shaft and the odd-numbered level reverse rotation transmission gear train, and
an odd-numbered level forward/reverse switching mechanical clutch provided on the odd-numbered level transmission shaft, the odd-numbered level forward/reverse switching mechanical clutch selecting any one of the odd-numbered level transmission gear train and the odd-numbered level reverse rotation transmission gear train and coupling it with the odd-numbered level transmission shaft;
the even-numbered level speed change mechanism includes
an even-numbered level reverse rotation idler shaft placed between the input shaft and the even-numbered level transmission shaft,
an even-numbered level reverse rotation transmission gear train placed between the input shaft, the reverse rotation idler shaft, and the even-numbered level transmission shaft,
an even-numbered level main clutch for coupling the input shaft and the even-numbered level transmission gear train,
an even-numbered level reverse rotation main clutch for coupling the input shaft and the even-numbered level reverse rotation transmission gear train, and
an even-numbered level forward/reverse switching mechanical clutch provided on the even-numbered level transmission shaft, the even-numbered level forward/reverse switching mechanical clutch selecting any one of the even-numbered level transmission gear train and the even-numbered level reverse rotation transmission gear train and coupling it with the even-numbered level transmission shaft;
when the output shaft is rotated in the first direction,
a rotation of the input shaft is transmitted in the odd-numbered level speed change mechanism to the odd-numbered level transmission shaft through the odd-numbered level main clutch, the odd-numbered level transmission gear train, and the odd-numbered level forward/reverse switching mechanical clutch, and
a rotation of the input shaft is transmitted in the even-numbered level speed change mechanism to the even-numbered level transmission shaft through the even-numbered level main clutch, the even-numbered level transmission gear train, and the even-numbered level forward/reverse switching mechanical clutch; and
when the output shaft is rotated in a second direction opposite to the rotation in the first direction,
a rotation of the input shaft is transmitted in the odd-numbered level speed change mechanism to the odd-numbered level transmission shaft through the odd-numbered level reverse rotation main clutch, the odd-numbered level reverse rotation transmission gear train, and the odd-numbered level forward/reverse switching mechanical clutch, and
a rotation of the input shaft is transmitted in the even-numbered level speed change mechanism to the even-numbered level transmission shaft through the even-numbered level reverse rotation main clutch, the even-numbered level reverse rotation transmission gear train, and the even-numbered level forward/reverse switching mechanical clutch.

10. The twin clutch transmission according to claim 9, wherein:
in the odd-numbered level speed change mechanism,
an input shaft side gear in the odd-numbered level reverse rotation transmission gear train is shared with an input shaft side gear in the even-numbered level transmission gear train, and
the odd-numbered level reverse rotation main clutch is shared with the even-numbered level main clutch;
in the even-numbered level speed change mechanism,
an input shaft side gear in the even-numbered level reverse rotation transmission gear train is shared with an input shaft side gear in the odd-numbered level transmission gear train, and
the even-numbered level reverse rotation main clutch is shared with the odd-numbered level main clutch; and
when the output shaft is rotated in the second direction, a rotation of the input shaft is transmitted in the odd-numbered level speed change mechanism to the odd-numbered level transmission shaft through the even-numbered level main clutch, the odd-numbered level reverse rotation transmission gear train, and the odd-numbered level forward/reverse switching mechanical clutch, and a rotation of the input shaft is transmitted in the even-numbered level speed change mechanism to the even-numbered level transmission shaft through the odd-numbered level main clutch, the even-numbered level reverse rotation transmission gear train, and the even-numbered level forward/reverse switching mechanical clutch.

11. The twin clutch transmission according to claim 9 or 10, wherein:

gear ratios of the odd-numbered level reverse rotation transmission gear train and the even-numbered level transmission gear train are approximately equal to each other and gear ratios of the even-numbered level reverse rotation transmission gear train and the odd-numbered level transmission gear train are approximately equal to each other; and when the output shaft is rotated in the second direction,
the odd-numbered level speed change mechanism performs a speed change of an even-numbered level and the even-numbered level speed change mechanism performs a speed change of an odd-numbered level.

12. The twin clutch transmission according to claim 9, wherein the synchronizing speed change mechanism includes:

a first synchronizing gear train for coupling the odd-numbered level transmission shaft and the even-numbered level transmission shaft so as to obtain a first rotation ratio therebetween;

a first synchronizing clutch for selecting coupling by the first synchronizing gear train;

a second synchronizing gear train for coupling the odd-numbered level transmission shaft and the even-numbered level transmission shaft so as to obtain a second rotation ratio therebetween;

a second synchronizing clutch for selecting coupling by the second synchronizing gear train;

a third synchronizing gear train for coupling the odd-numbered level transmission shaft and the even-numbered level transmission shaft so as to obtain a third rotation ratio therebetween; and a third synchronizing clutch for selecting coupling by the third synchronizing gear train.

13. The twin clutch transmission according to claim 12, wherein:

in the synchronizing speed change mechanism the first rotation ratio is approximately 1, the second rotation ratio is approximately equal to a square of an interlevel ratio between adjacent speed levels, and the third rotation ratio is approximately equal to an inverse of the square of the interlevel ratio;

when the output shaft is rotated in the first direction, a shift-up or a shift-down is performed while achieving synchronization between the odd-numbered level speed change mechanism and the even-numbered level speed change mechanism by selectively coupling the first synchronizing gear train with the second synchronizing gear train; and when the output shaft is rotated in the second direction, a shift-up or a shift-down is performed while achieving synchronization between the odd-numbered level speed change mechanism and the even-numbered level speed change mechanism by selectively coupling the first synchronizing gear train with the third synchronizing gear train.

* * * * *